March 7, 1961 J. B. WIENER 2,974,307
CARD PROCESSING SYSTEM
Filed Aug. 27, 1956 9 Sheets-Sheet 1

INVENTOR:
Jerome B. Wiener
By Smyth & Roston
Attorneys

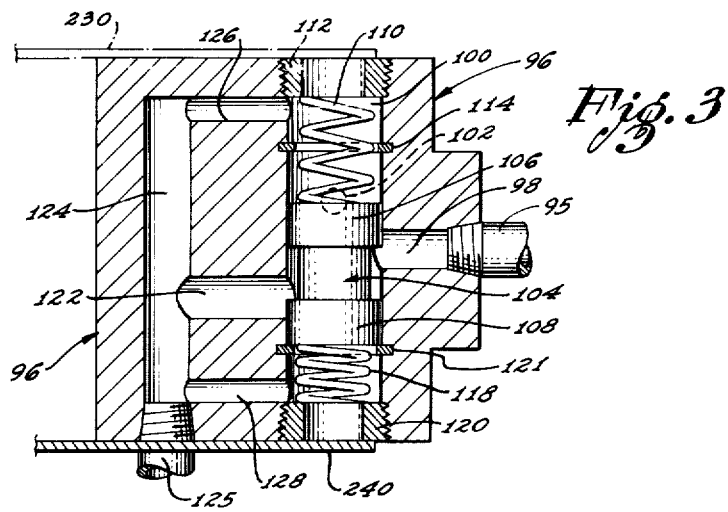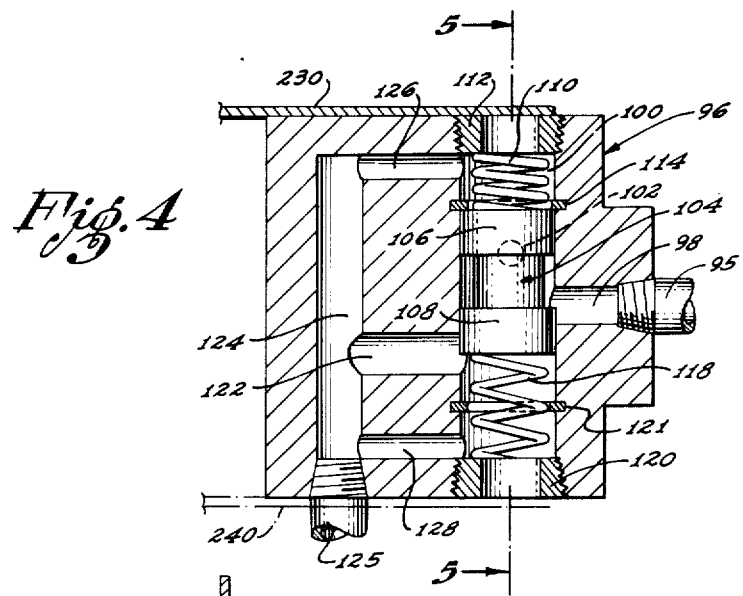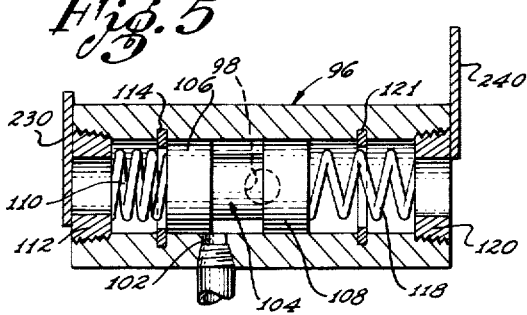

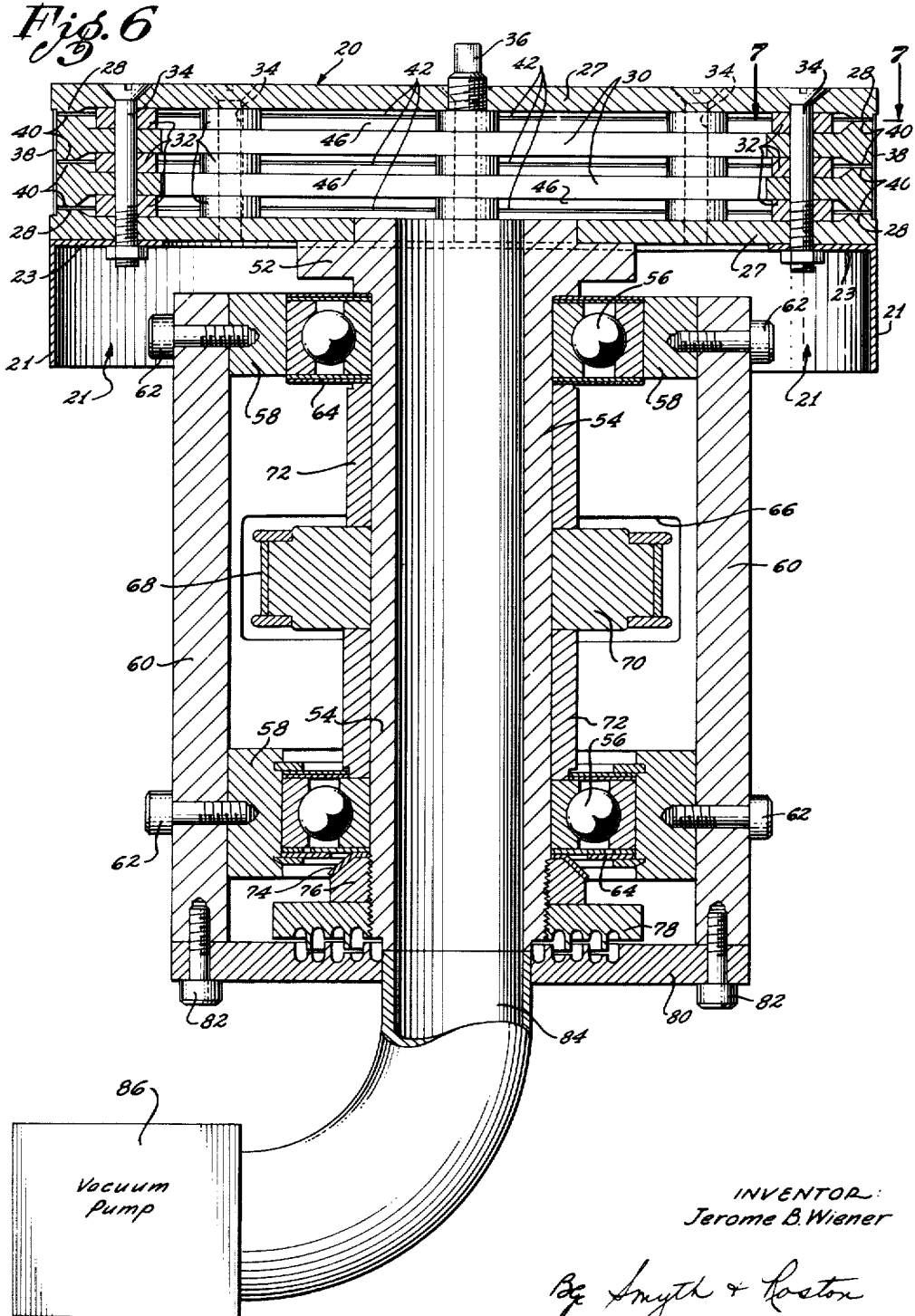

March 7, 1961 J. B. WIENER 2,974,307
CARD PROCESSING SYSTEM
Filed Aug. 27, 1956 9 Sheets-Sheet 4
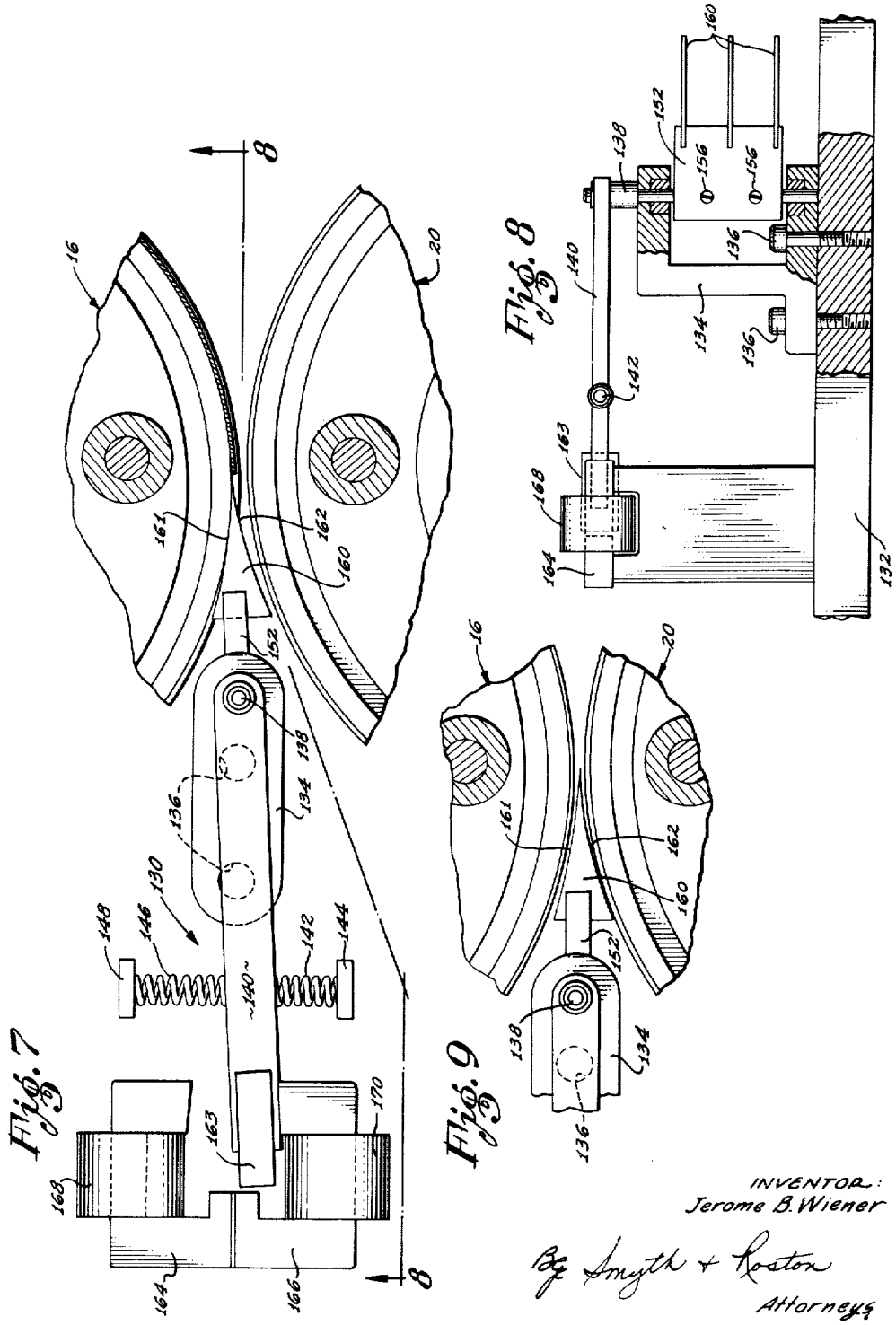
INVENTOR:
Jerome B. Wiener
By Smyth + Roston
Attorneys March 7, 1961 J. B. WIENER 2,974,307
CARD PROCESSING SYSTEM
Filed Aug. 27, 1956 9 Sheets-Sheet 5

Fig. 10

INVENTOR:
Jerome B. Wiener
By Smyth + Roston
Attorneys

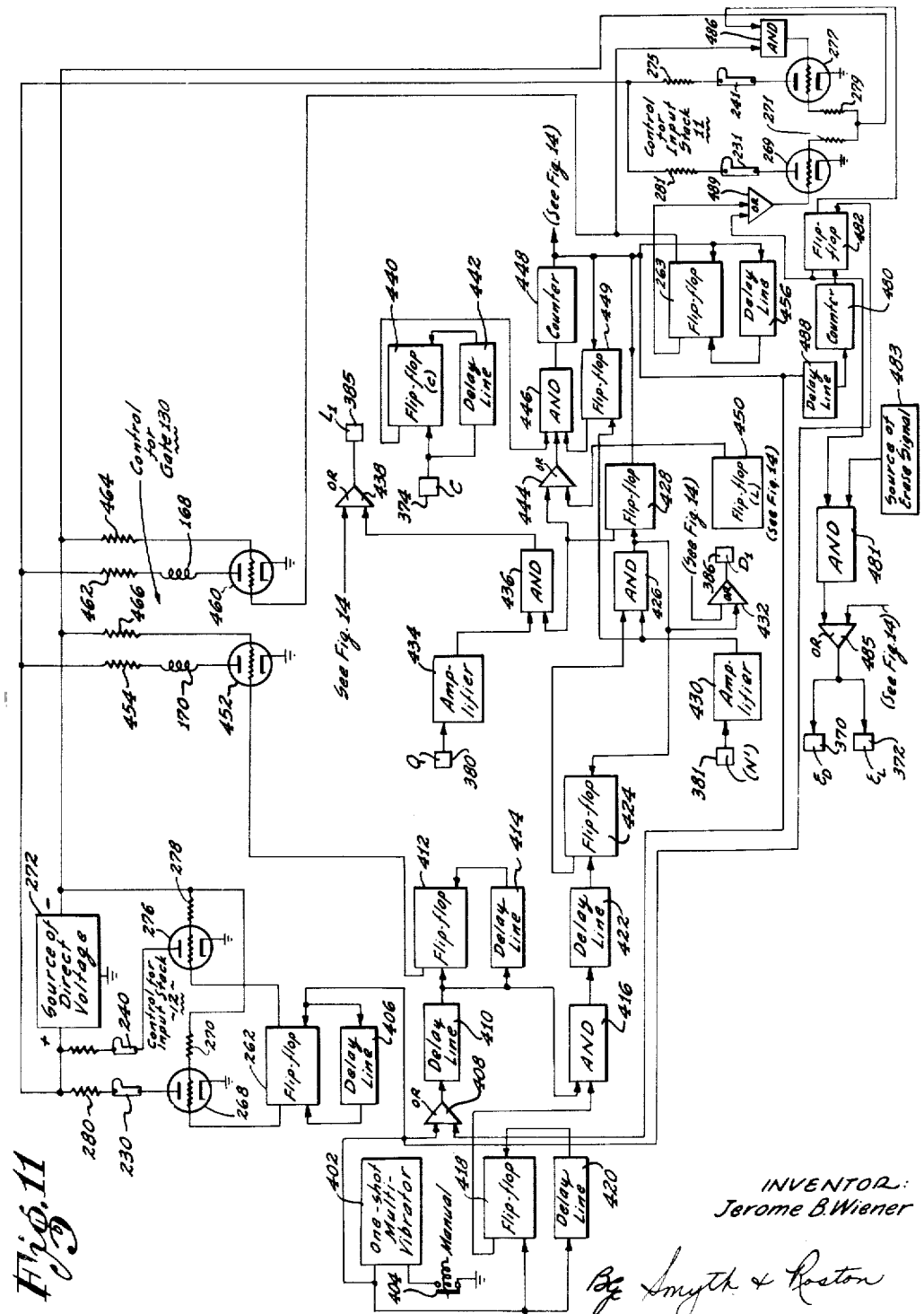

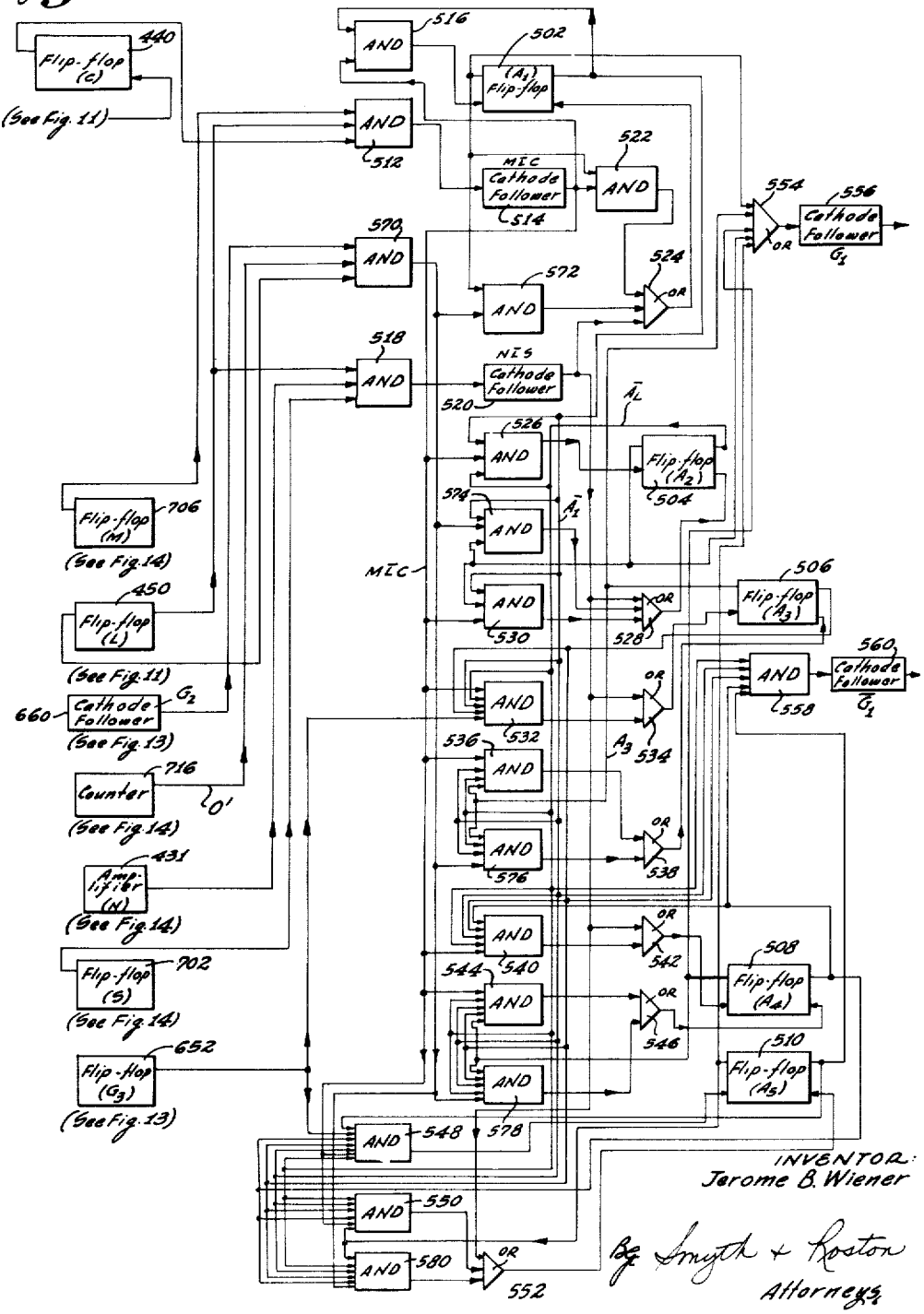

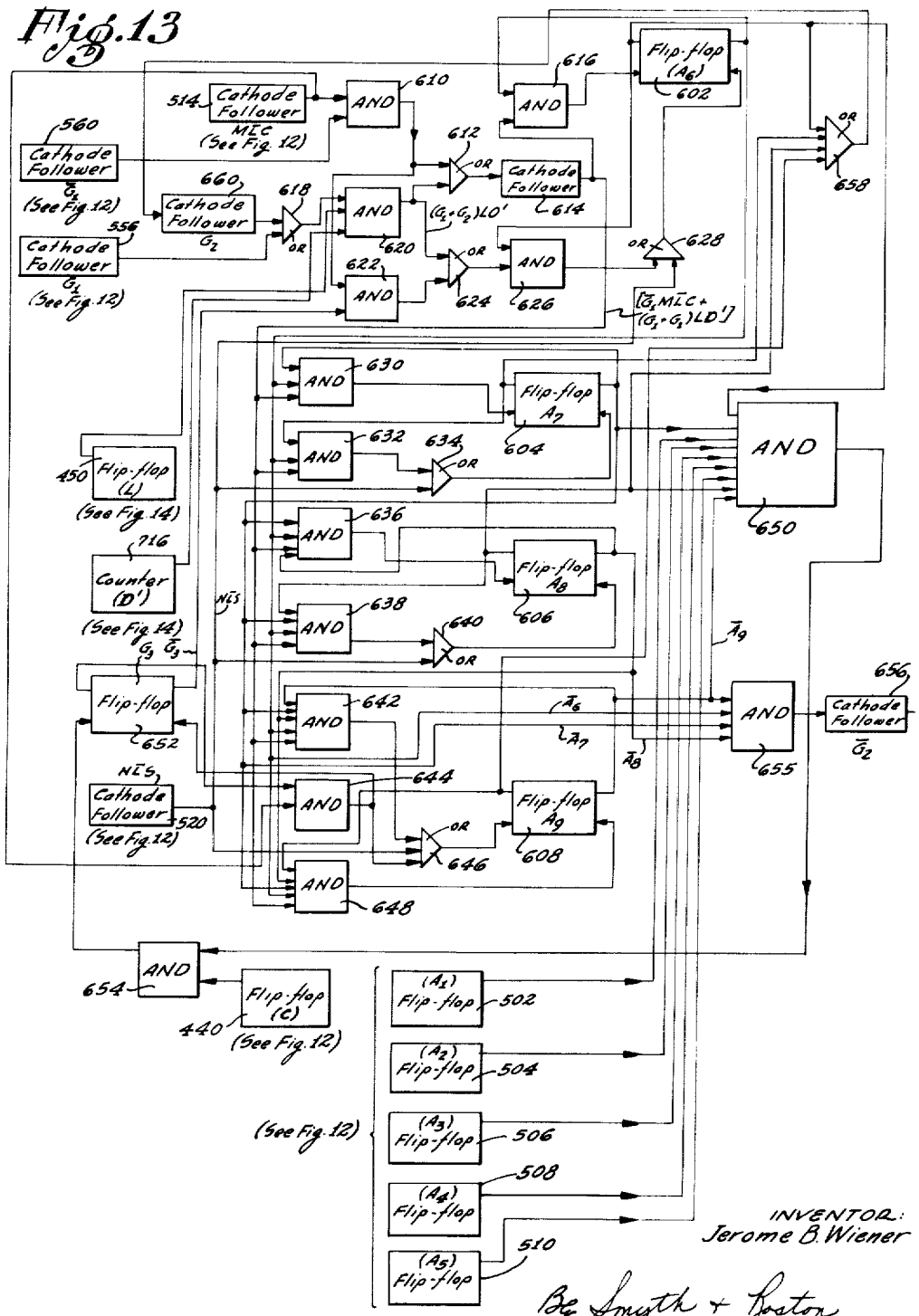

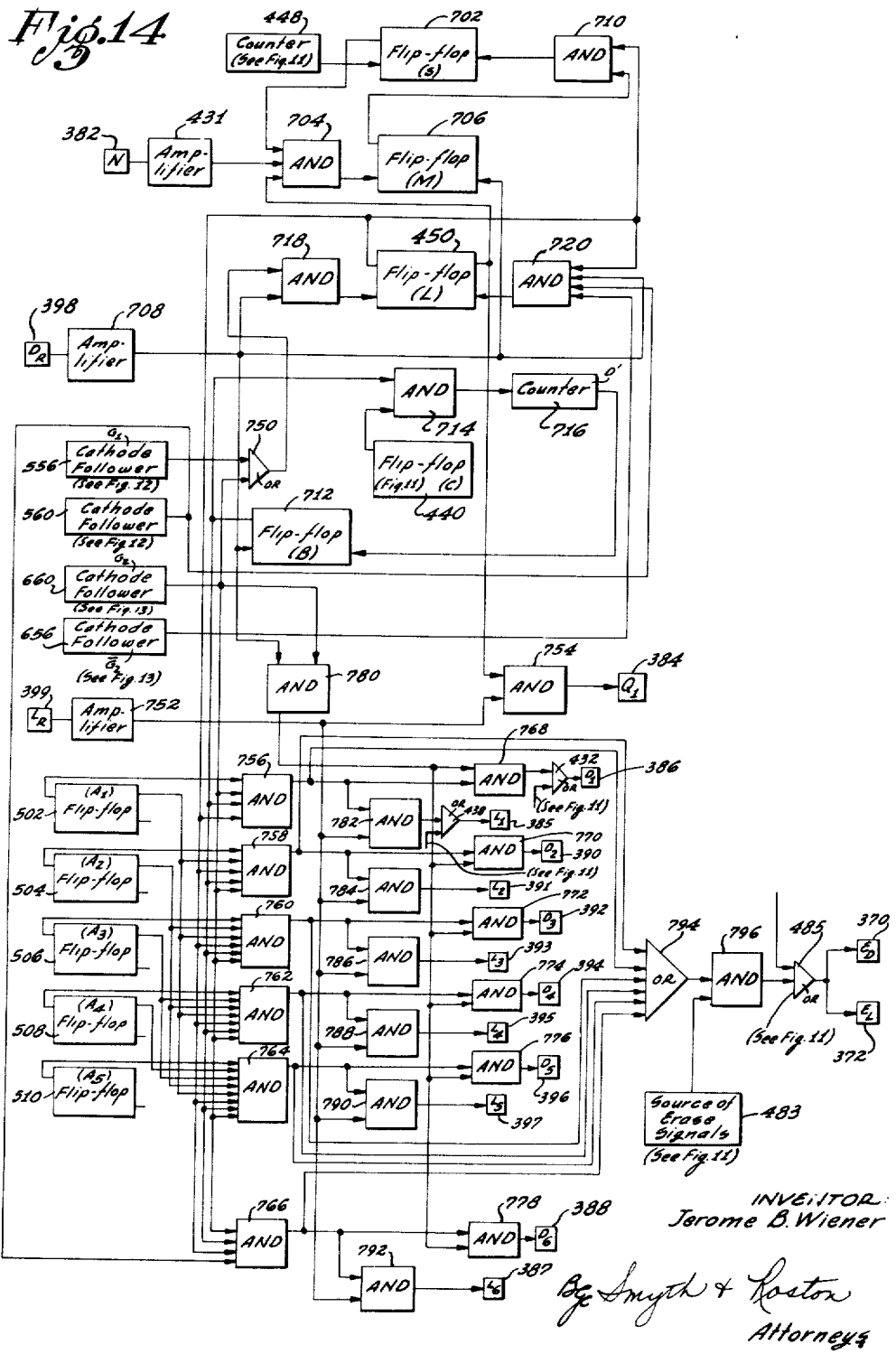

United States Patent Office 2,974,307
Patented Mar. 7, 1961

2,974,307

CARD PROCESSING SYSTEM

Jerome B. Wiener, Granada Hills, Calif., assignor to The Magnavox Company, Los Angeles, Calif., a corporation of Delaware Filed Aug. 27, 1956, Ser. No. 606,456

17 Claims. (Cl. 340—172.5)

This invention relates to computers and data processing systems and more particularly to apparatus for duplicating on one or more computer storage cards information previously recorded and stored on a master card.

Computers and data processing systems which use digital techniques for solving complex mathematical and business problems have been built in significant numbers in recent years. Present day computers are capable of solving in an extremely short time complex mathematical problems which otherwise would normally require many months of intense mental labor. Data processing systems are in operation in department stores and in banks. These systems are capable of receiving, assimilating and storing information relating to the many complex operations carried on in such institutions and for making such information readily available.

In one type of data processing system, the digital information relating to the different items recorded by the system is stored on a plurality of information storage cards. In a complex data processing system there are often millions of bits of information to be stored, and this requires hundreds of thousands of such cards. With such a large number of cards, problems arise in providing for the efficient transfer of information to and from each card. For example, duplication from one card to a plurality of other cards is often required in a complex data processing system so that information can be stored under different categories common to that information.

An object of the present invention is to provide improved duplicating apparatus which operates accurately, quickly and efficiently to transfer information from a master information storage card to one or more slave information storage cards. This object may be achieved in accordance with one embodiment of the invention in the following manner:

A master information storage card is transported on a rotatable transporting drum past a sensing or read transducer head, and the information on that card is read by the head and transferred to a write transducer head to be recorded on a magnetic member. This magnetic storage member may be in the form of a second drum coaxial with and affixed to the transporting drum. The magnetic storage member may also be separate from the drum and may be driven at a speed synchronous with that of the transporting drum. The magnetic storage member may also be driven at a speed at which successive digital positions are driven synchronously on the magnetic member and on the card positioned on the drum. The magnetic storage drum may be coated with material capable of being permanently magnetized so that digital information or data can be magneticaly recorded on its surface.

A slave information storage card is now fed to and circulated on the transporting drum. The data on the magnetic drum is then shifted until it bears a predetermined angular relation with the position of the slave card on the transporting drum and the data is recorded on the slave card. Subsequent slave cards are then successively transported by the transporting drum, and the data on the magnetic drum is shifted for each such slave card so as to have a predetermined angular relationship with the same. The data from the master card is recorded and duplicated in this manner on each slave card.

In the drawings:

Figure 3 is an enlarged sectional view substantially on the line 3—3 of Figure 2 and illustrates in some detail a valve assembly incorporated in one of the components of the transfer mechanism of Figure 2, the valve assembly in this view being positioned to prevent the transfer of cards from the input stack to a rotatable transporting drum included in the apparatus of Figure 1;

Figure 4 is an enlarged sectional view similar to that shown in Figure 3 and illustrates the position of the valve assembly to permit a card to be withdrawn from the input stack by the rotatable transporting drum;

Figure 5 is an enlarged sectional view substantially on the line 5—5 of Figure 4 and illustrates in further detail the disposition of the valve assembly when a card is being withdrawn from the input stack by the rotatable transporting drum;

Figure 6 is an enlarged sectional view substantially on the line 6—6 of Figure 1 and illustrates in further detail one of the transporting drums and an associated coaxial magnetic drum forming a part of the embodiment shown in Figure 1;

Figure 7 is an enlarged fragmentary sectional view substantially on the line 7—7 of Figure 6 and shows in further detail the construction and relative disposition of a pivotable gate and a pair of transporting drums included in the embodiment shown in Figure 1, the gate having been pivoted into one of its operative positions;

Figure 8 is a fragmentary sectional view substantially on the line 8—8 of Figure 7 and illustrates in further detail the construction of the pivotable gate shown in Figure 7;

Figure 9 is a fragmentary view similar to that shown in Figure 7 and illustrates the disposition of the gate relative to the associated drums in the neutral position of the gate;

Figure 1:
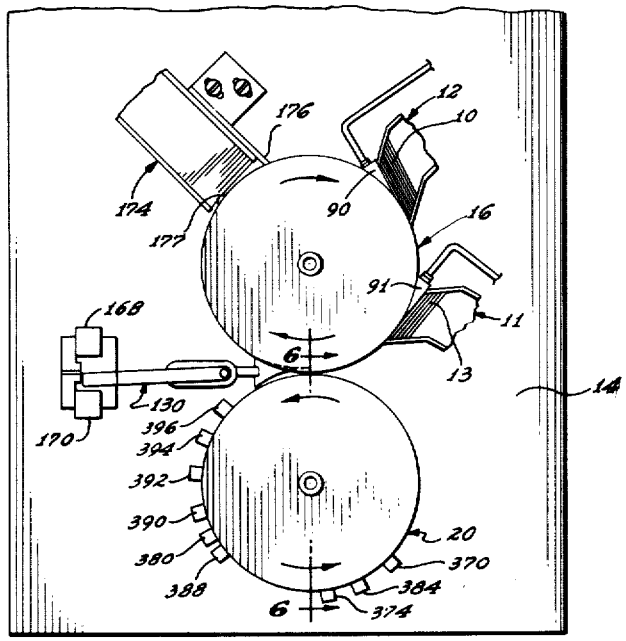
Figure 1 is a top plan view schematically illustrating apparatus forming one embodiment of this invention, such apparatus being constructed and controlled in a manner to be described to duplicate information from a master card on one or more slave cards.
Figure 10:
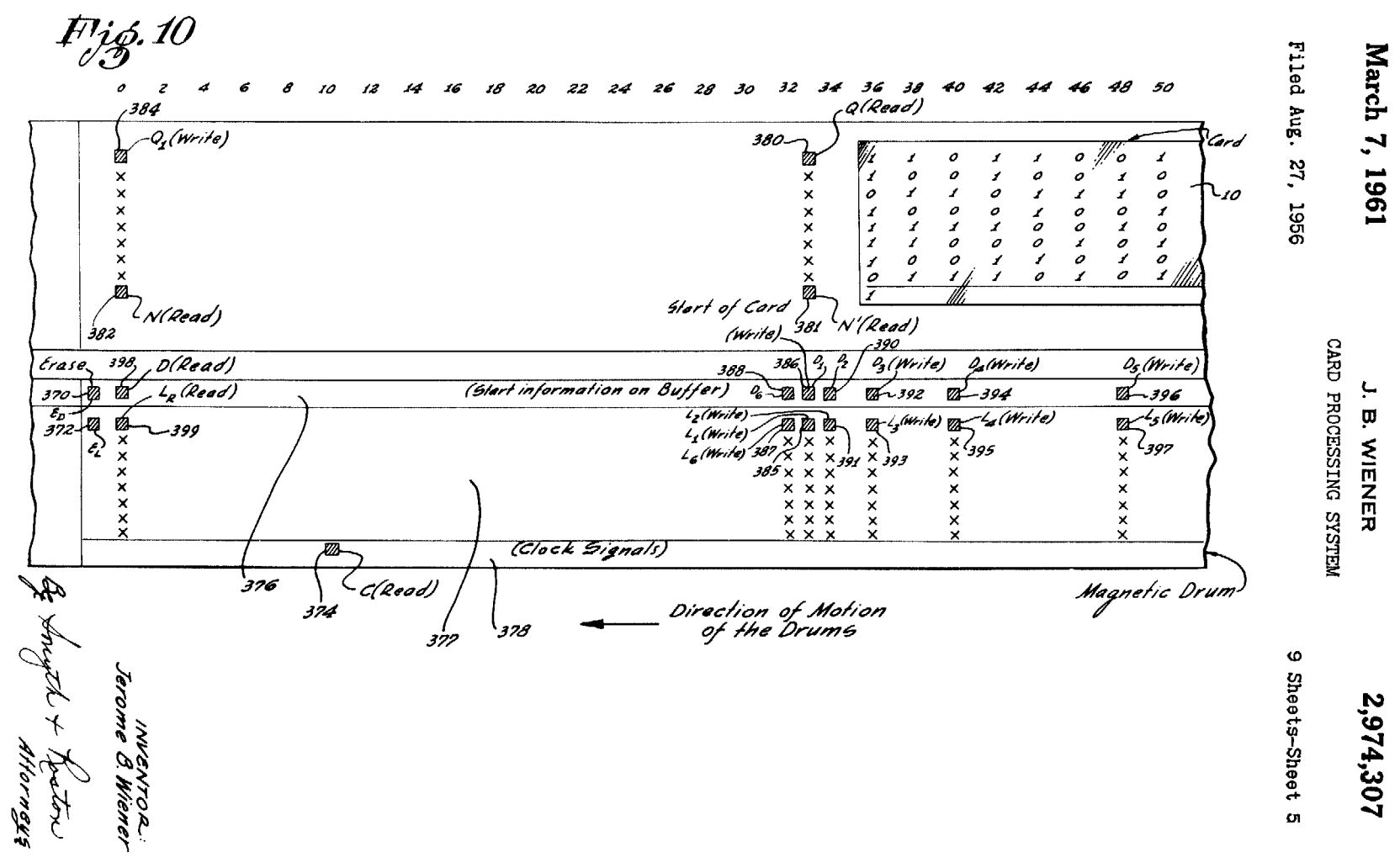

Figure 10 is a fragmentary developed view of one of the drums of Figure 1 and shows the position of a plurality of transducer heads mounted adjacent the periphery of the drum; and Figures 11 to 14, inclusive, are circuit diagrams, partly in block form, somewhat schematically illustrating electric systems for controlling the operation of the apparatus shown in the previous figures so as to obtain a duplication on one or more slave cards of information recorded on a master card.

In the embodiment of the invention shown in the drawings, a plurality of master cards 10 (Figure 1) are held in a first input stack 12. The bottom edges of the master card are supported on a flat horizontal surface such as the top of a table 14. Each card is held in the input stack 12 in a substantially vertical position.

As shown in Figure 10, each master card 10 has a plurality of bits of digital information recorded thereon in a row of transverse columns. Each bit of digital information by itself or in combination with other bits of information may relate to numbers, alphabetical letters, combinations of numbers and letters (alpha-numeric coding) or to any other pertinent matter known to the art.

The bits of digital information may be recorded in any suitable form on the master card 10. For example, the information may be represented by holes or the absence of holes at the different positions. Preferably, however, the information is represented in magnetic form, with magnetic fluxes of one polarity representing an indication of "0" or a "false" state and magnetic fluxes of the opposite polarity representing an indication of "1" or a "true" state.

As previously noted, the magnetic fluxes are arranged on card 10 in a row of transverse columns. The card also contains a magnetic flux at its lower left-hand corner (Figure 10) corresponding, for example, to the first position on the card. This flux is used in a manner to be described to indicate the start of the card, and it represents, for example, an indication of "1."

A transporting drum 16 (Figure 1) is rotatable about a vertical axis, and its periphery is in contiguous relation with the mouth of the input stack 12. The drum 16 is shown as rotating in a clockwise direction in Figure 1. A second input stack 11 is supported on the top of the table 14 in contiguous relation with the periphery of the drum 16. The stack 11 is displaced a selected angular distance from the input stack 12 in the direction of rotation of drum 16, and it supports a plurality of slave cards 13 in a stacked condition similar to the manner in which the master cards 10 are supported in the input stack 12. The slave cards 13 are similar to the master cards 10, except that the magnetic fluxes in each column on the slave cards have only one polarity. For convenience, the flux on the slave cards will be considered to indicate the "0" or "false" state in each position. Each of these slave cards, however, like the master card contains a magnetic flux at its lower lefthand corner corresponding to the first position of the slave card and representing "1" or a "true" state. This flux is used in a manner to be described to indicate the position of a slave card on a transporting drum.

A rotatable transporting drum 20 is disposed in contiguous relation to the drum 16 at a position angularly displaced from the input stacks 11 and 12 in the direction of rotation of the drum 16. The drum 20 is rotatable in a counter-clockwise direction, that is, opposite to the direction of rotation of the drum 16.

Figure 2:
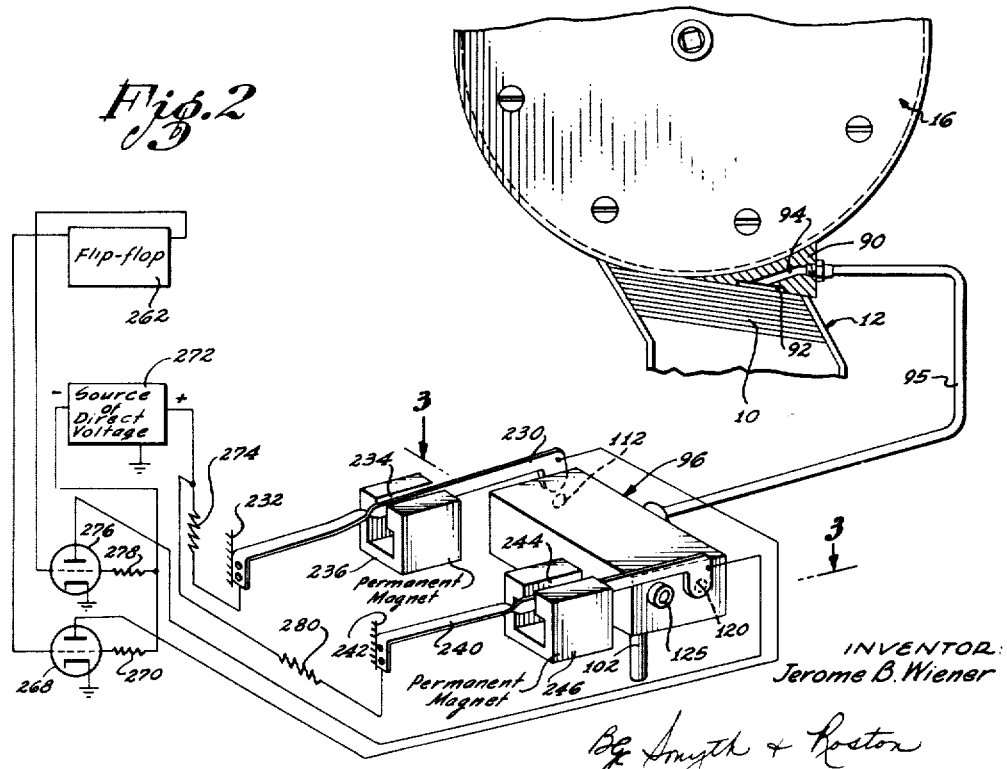
Figure 2 is a view, partly in plan and partly in perspective, somewhat schematically illustrating the mechanical features of an input stack and transfer mechanism that can be used in the apparatus of Figure 1, and Figure 2 also shows an electrical circuit for controlling the transfer mechanism.

A wedge-shaped retainer generally retained at 90 is associated with the input stack 12 (Figures 1 and 2). The retainer 90 is positioned adjacent to the periphery of the drum 16 and is interposed between the input stack 12 and the drum. The retainer member 90 extends partially across the mouth of the stack 12 from the leading side of the stack with respect to the direction of rotation of the drum 16. The member 90 is disposed in contiguous relationship to a trailing portion of the first card 10 in the stack 12, and the leading portion of this surface contacts the periphery of the drum 16. The member 90 is also provided with one or more orifices 92. As will be described in detail subsequently, the orifices 92 exert a vacuum force against the first card 10 to retain the card in the input stack 12 against a force exerted on the card by the peripheral surface of the drum 16. The first card 10 is, therefore, retained in the input stack 12 until the vacuum force exerted by the orifices 92 is removed.

A similar wedge-shaped retainer member indicated generally at 91 is interposed between the input stack 11 and the drum 16. The retainer member 91 may be generally similar to the retainer 90 and extends partially across the mouth of the stack 11 from the leading side of the stack 11 with respect to the direction of rotation of the drum 16. The retainer member 91 contacts the trailing portion of the first slave card 13 in the stack 11 and the drum 16 exerts a force on the leading portion of this card. The member 91 is also provided with one or more orifices in which a vacuum force is established, and a slave card is released from the input stack 11 only when the vacuum force is removed from these orifices.

In a manner to be described in detail, the vacuum force in the orifices of the retainers 90 and 91 is controlled so that only one card at a time may be released from the input stack 11 or from the input stack 12 to be transported on the periphery of the drum 16.

An output or pick-up stack 174 (Figure 1) is positioned in contiguous relationship to the periphery of the drum 16 in a clockwise direction around the drum with respect to the disposition of the input stacks 12 and 13. A stop 176 is also associated with the drum 16 and the output stack 174 in abutting relationship with the drum 16 to prevent the movement of cards on the drum past the stop and to strip the cards from the drum and deposit them in the output stack. The stop 176 is slightly removed from the stack 174 in a clockwise direction corresponding to the direction of movement of the drum 16. Pawls 177 may also be associated with the output stack 174 and may be disposed in contiguous relationship with the drum 16 on the opposite side of the stack from the stop 176. The pawls 177 are positioned between the opposite walls defining the leading and trailing edges of the stack 176. The pawls 177 operate to insure that the cards become deposited in the stack 174 in the same order as their travel on the periphery of the drum.

The construction of the input stacks 11 and 12 and their respective transfer mechanisms and electrical control systems may be similar to the apparatus and system disclosed in copending application Serial No. 552,506 filed December 12, 1955, now Patent No. 2,927,791 in the name of Hans M. Stern and assigned to the assignee of the present application. Since the transfer mechanism and electrical control system may be the same for the input stack 11 as for the input stack 12, only the one for the input stack 12 need be described.

As shown in Figure 2, a series of openings such as the opening 94 extend through the retainer 90 from the orifices 92 and communicate with a pipe 95. The pipe 95 is connected to a valve housing 96, and it communicates with a port 98 in the housing (Figures 3, 4 and 5). The port 98 in turn communicates with a chamber 100 which extends through the housing 96 in a direction transverse to the port. The chamber 100 is open to the atmosphere at opposite ends of the housing 96 and is preferably cylindrical in shape. This chamber also communicates with the atmosphere through an exhaust orifice 102 disposed at an intermediate position in the chamber.

A piston 104 is movable within the chamber 100. This piston includes a pair of heads 106 and 108 at its opposite ends, these heads being interconnected by an intermediate stem of reduced diameter with respect to the heads. The diameters of the heads 106 and 108 correspond to the internal diameter of chamber 100 so as to fit snugly within the chamber. The head 106 is positioned near the exhaust orifice 102 to prevent the exhaust orifice from communicating with a vacuum line in one position of the piston 104. The head 106 is movable with the piston 104 to a second position to open the exhaust orifice 102 to the vacuum line. A helical spring 110 is disposed between the head 106 and a hollow plug 112, the hollow plug being screwed into the upper mouth of the chamber 100 in Figures 3 and 4. A sealing ring 114 is secured to the wall of the chamber 100 at a position between the head 106 and the plug 112 to limit upward movement of the piston 104.

In like manner, a helical spring 118 is mounted between the head 108 and a hollow plug 120, the hollow plug being screwed into the lower mouth of the chamber 100 in Figures 3 and 4. A sealing ring 121 is supported in the wall of the chamber 100 at a position between the head 108 and the plug 120 to limit the downward movement of the piston 104. The head 108 is disposed adjacent an end of a conduit 122 in the housing 96 to close that end of the conduit in one position of the piston 104. The piston is movable to a second position in which the head 108 opens a path from the conduit 122 through the chamber 100 to the port 98 and, therefore, to the pipe 95.

The other end of the conduit 122 opens into a conduit 124 in the valve housing. The latter conduit extends parallel to the chamber 100 and is connected to a pipe line 125. The pipe 125 is connected to a suitable vacuum pump (not shown). Passageways 126 and 128 extend in the valve housing parallel to the conduit 122 and on opposite sides of that conduit. These passageways connect the conduit 124 to the opposite ends of the chamber 100. The passageway 126 joins the chamber 100 at a position between the plug 112 and the piston head 106, and the passageway 128 joins the chamber 100 at a position between the piston head 108 and the plug 120.

A resilient electrically conductive arm 230 is movable, in a manner to be described, between an open position and a closed position contiguous to the upper mouth of the chamber 100. In its closed position, the arm 230 seals this mouth, as best seen in Figure 4. The arm is supported by a wall 232 (Figure 2) at its opposite end so that it can be flexed about the wall 232 as a fulcrum from its closed position to an open position away from the hollow plug 112 in the mouth of chamber 100. At an intermediate position along its length, the arm 230 extends through a static magnetic field in an air gap 234 of a permanent magnet 236. The permanent magnet 236 may be replaced by an electromagnet, it being desired merely that a static magnetic flux be produced in the air gap 234.

In like manner, one end of a resilient electrically conductive arm 240 is adapted to be movable between an open position and a closed position contiguous to the opposite mouth of the chamber 100 against the hollow plug 120. The arm 240 is attached at its opposite end to a wall 242 so that it can be flexed about that wall as a fulcrum from its closed position to a position opening the mouth of the channel 100 through the plug 120. The arm 240 extends through an air gap 244 in a permanent magnet 246 which may have a configuration corresponding to that of the permanent magnet 236. The magnet 246 may likewise be an electromagnet if so desired.

The fixed end of the arm 230 is connected to one terminal of a resistor 274, the other terminal of this resistor being connected to the positive terminal of a source of direct voltage 272. The free end of the arm 230 is connected to the anode of a triode vacuum tube 268. The control grid of this tube is connected to one terminal of a resistor 270, the other terminal of this resistor being connected to the negative terminal of the source 272. The cathode of the tube 276 is grounded.

Likewise, the fixed end of the arm 240 is connected to one terminal of a resistor 280, the other terminal of which is connected to the positive terminal of the source 272. The other end of the arm 240 is connected to the anode of a triode vacuum tube 276. The control grid of the tube 276 is connected to a resistor 278, and this resistor is connected to the negative terminal of the source 272. The cathode of the tube 268 is grounded. The right output terminal of a flip-flop 262 is connected to the control grid of the tube 276, and the left output terminal of this flip-flop is connected to the control grid of the tube 268. This flip-flop is controlled in a manner to be described.

When the flip-flop 262 is in its "true" state so that a relatively high voltage is produced at its left output terminal, this voltage is introduced to the grid of the tube 268 to render that tube conductive. Current then flows through a circuit including the voltage source 272, the resistor 274, the arm 230 and the tube 268. The flow of current through the arm 230 produces a magnetic field around the arm in accordance with well-known electric-magnetic principles, and this field reacts with the magnetic flux in the air gap 234. These two magnetic fields react with one another to exert a force on the arm 234 so as to cause the arm to pivot about the wall 232 and move its free end upwardly in Figure 2 to an open position away from the mouth of the chamber 100 adjacent the plug 112. At this time, there is no current flow through the other arm 240 and it is held in a closed position against the plug 120.

As best seen in Figure 3, when the mouth of the chamber 100 adjacent the plug 112 is opened, the space above the head 106 of the piston 104 is opened to the atmosphere. At the same time, a vacuum pressure is exerted through the pipe 125 and through the conduit 124 and the passageway 128 to the portion of the chamber 100 below the head 108 of the piston 104. This lowers the pressure in the portion of the chamber 100 below the head 108. By maintaining the portion of the chamber 100 below the head 108 at reduced pressure and the portion of the channel above the head 106 at atmospheric pressure, a downward force is exerted upon the piston 104. This force causes the piston 104 to move downwardly against the action of the springs 110 and 118.

When the piston 104 has moved to the position shown in Figure 3, the head 108 is positioned away from the conduit 122 to open the end of that conduit to the chamber 100. Because of this, the vacuum force created in pipe 125 is communicated to the pipe 95 through the conduit 124, the conduit 122, the chamber 100, and the port 98. This enables a vacuum force to be exerted at the orifices 92 of the retainer member 90 in Figure 2. This vacuum force causes the card 10 adjacent the orifices 92 to be held against the retainer. It will be remembered that this condition exists whenever the flip-flop 262 is in its "true" state.

When the card 10 of the input stack 12 contiguous to the retainer 90 is held against the retainer by the vacuum force described in the preceding paragraphs, the retainer exerts a retarding force to inhibit the transfer of this card from the input stack to the drum 16. This retarding force is exerted against the trailing portion of the card. At the same time, the drum 16 is exerting a force against the leading portion of the card in a direction for transferring the card from the input stack to the drum. However, the retarding force exerted by the retainer 90 is greater than the force exerted by the drum 16. Because of this, the cards 10 are prevented from leaving the input stack 12 as long as the vacuum forces are maintained in the orifices 92.

When the flip-flop 262 is triggered to its "false" state, a relatively high voltage is produced on its right output terminal and a relatively low voltage is produced on its left output terminal. When a low voltage is produced on the right output terminal of the flip-flop, the tube 268 becomes nonconductive and the current flow through the resilient arm 230 is interrupted. This causes the arm 230 to be returned by its resilience to its original position adjacent the plug 112 so as to close the mouth of the chamber 100, as shown in Figure 4. The pressure in the portion of the chamber 100 between the head 106 and the plug 112 may now be reduced below atmospheric pressure by the suction created through the pipe 125, the conduit 124 and the passageway 126.

The relatively high voltage now produced on the right output terminal of the flip-flop 262 causes the tube 276 to become conductive such that a current flows through the resistor 280 and through the arm 240. The flow of current through the arm 240 causes a magnetic field to be produced about this arm. This field reacts with the static magnet field in the air gap 244 of the permanent magnet 246 to pivot the arm 240 upwardly away from the plug 120 in the mouth of the chamber 100, as shown in Figure 4. This opens to the atmosphere the portion of the chamber 100 between the head 108 and the plug 120.

Since the upper portion of the chamber 100 in Figure 4 is at a pressure considerably below atmospheric, and the lower portion of this chamber in Figure 4 is at atmospheric pressure, a force is exerted on the piston 104 in an upward direction in Figure 4. This causes the head 106 to move above the exhaust orifice 102 in Figure 4 so that the central portion of the chamber 100 between the heads 106 and 108 becomes exposed to atmospheric pressure. Because of this, the port 98 and the pipe 95 are established at atmospheric pressure and the vacuum force is removed from the orifices 92 in the retainer 90 of Figure 2. This interrupts the retarding force that was exerted on the first card 10 in the stack 12 by the retainer 90.

When the retarding force exerted by the retainer 90 becomes interrupted, the force exerted by the drum 16 causes the card to be transferred from the input stack 12 to the periphery of the drum 16. This happens whenever the flip-flop 262 is triggered to its "false" state. The flip-flop 262 is controlled in a manner to be described, so that it is periodically triggered from its "true" state to its "false" state and for just a sufficient interval to permit only one card to be released from the input stack 12 and transferred to the drum 16.

The various components of the control system for the transfer mechanism of the stack 11 are shown schematically in Figure 11, as are the components of the control system for the transfer mechanism of the stack 12. Reference will now be made briefly to that figure, and merely to identify the components of these control systems. The control system for the transfer mechanism of the stack 11 includes a pair of triode vacuum tubes 269 and 277 as shown in the lower right corner of Figure 11. The anode of the tube 269 is connected through a resilient electrically conductive arm 231 to one terminal of a resistor 281. The arm 231 corresponds to the arm 230 in the transfer mechanism of the stack 12. The cathode of the tube 269 is grounded and the control grid of the tube is connected to one terminal of a resistor 271. The other terminal of the resistor 271 is connected to the negative terminal of the source 272 of direct voltage.

The anode of the tube 277 is connected through a resilient electrically conductive arm 241 to one terminal of a resistor 275. The arm 241 corresponds to the arm 240 in the transfer mechanism of the stack 12. The control grid of the tube 277 is connected to a resistor 279 which is in turn connected to the negative terminal of the source 272 of direct voltage. The other terminals of the resistor 281 and of the resistor 275 are connected to the positive terminal of the source 272.

A flip-flop 263 corresponds to the flip-flop 262 in the control system for the transfer mechanism of the stack 12. The flip-flop 263 has its left output terminal connected through an "or" network 489 to the control grid of the tube 269. A connection is made from the right output terminal of the flip-flop 263 to an "and" network 486 which is in turn connected to the control grid of the tube 277.

Whenever the flip-flop 263 is in its "true" state as represented by a relatively high voltage on its left output terminal and a relatively low voltage on its right output terminal, the slave cards 13 are retained in the input stack 11 in the same way as the described manner in which the cards 10 are retained in the input stack 12. Whenever the flip-flop 263 is triggered to its "false" state however, a card 13 is released from the input stack 11. The flip-flop 263 is controlled in a manner to be described so that only one slave card 13 at a time is transferred from the input stack 11 to the periphery of the drum 16.

The drums 16 and 20 may be similar in their construction. Because of this, only the details of the drum 20 are shown in Figure 6. A magnetic storage member in the form of a drum section 21 is affixed to the drum 20 and in coaxial relation with the drum 20. As previously noted, the drum section 21 may be formed of non-magnetic material with a magnetic coating on its surface. Magnetic storage drums of this general type are well-known and are presently in wide use in the computer art for providing a storage for magnetic information. Such information is usually recorded on the surface of the drum in a series of peripheral channels extending in side-by-side relation around the drum. The recording is in the form of a plurality of individual magnetic fluxes which have one polarity, for example, to represent the digit "1," and which have the opposite polarity to represent the digit "0."

As previously pointed out, it is not necessary for the magnetic drum 21 to be affixed to the drum 20 as shown in Figure 6, but the illustrated arrangement represents a convenient apparatus for practicing the invention. It will become evident as the description proceeds that the magnetic drum 21 may be affixed to the drum 16 as shown, or it may be rotated on an independent axis at a rate synchronous with the drums 16 and 20. The term "synchronous" may be construed to include the rotation of the drum 20 and the magnetic drum 21 at the same speed. The term may also be construed to include any situation in which the speed of the drum 20 is substantially constant relative to the speed of the drum 21 such that information on the drum 21 is presented at the same rate as the information on a card positioned on the drum 20.

The drum 20 includes a pair of external plates 27 defining a housing and having inwardly disposed lip portions 28 at their peripheries. A second pair of plates 30 are disposed within the compartment defined by the plates 27 and are suitably positioned in spaced relationship with the plates 27, as by spacers 32 mounted on studs 34. The studs 34 extend through the plates 27 and 30 at positions near the peripheries of the plates so as to maintain the plates in a fixed position relative to one another. Moreover, the studs 34 at their lower ends extend through a flanged portion 23 of the magnetic drum 21 rigidly to hold the magnetic drum on to the lower side of the drum 20 and in coaxial relation with the drum 20. A plug 36 extends into a threaded socket in the upper plate 27 at the annulus center of the plate.

The radius of each of the plates 30 is slightly less than that of the plates 27 by an amount corresponding substantially to the thickness of the cards 10 and 13. This forms a channel portion 38 extending around the periphery of the drum. Each of the plates 30 has annular flange portions 40 extending axially from both faces at its periphery. The flange portions 40 are formed to produce peripheral slots 42 between the plates 30 and between the flanges 40 and lip portions 28. The slots 42 communicate with suction passageways 46 formed between the adjacent plates 27 and 30 by the spacers 32.

The drum 20 is disposed against an annular collar 52 provided at the end of a hollow shaft 54. Bearings 56 are provided at the opposite ends of the shaft 54. The inner races of the bearings are mounted on the shaft and the outer races of the bearings are disposed against bushings 58 secured to a housing 60 as by studs 62. Seals 64 are disposed at opposite ends of the bearings to prevent leakage of the lubricant from the bearings. An opening 66 is formed at an intermediate position in the housing 60 between the top and bottom bearings 56. This opening is provided to enable a drive belt 68 to extend into the housing and around a pulley 70. The pulley 70 is suitably positioned within the housing 60 and held against axial movement by sleeves 72 mounted on the shaft 54 between the bearings 56. The belt 68 is coupled to a suitable drive motor (not shown) for the shaft 54.

The bearings 56 and the sleeves 72 are held in fixed axial positions on the shaft 54 by a nut 76 which engages a lock washer 74. The nut 76 is adapted to be screwed on a threaded portion at the bottom of the shaft 54. A sealing disc 78 is also adapted to be screwed on the threaded portion of the shaft 54. The sealing disc 78 operates in conjunction with a bottom plate 80 of the housing 60 to provide an air lock between the interior of the housing and the interior of the hollow shaft 54. The bottom plate 80 is secured to the housing 60 as by studs 82. A hollow conduit 84 is disposed by friction or press fit within the plate 80. This enables air to be exhausted from the hollow interior of the shaft 54 and of the conduit 84 as by a vacuum pump 86. This pump is shown in block form only, and any suitable pump can be used. This pump creates a vacuum pressure at the periphery of the drum 20 through the suction passageways 46 to the peripheral slots 42. This pressure serves to draw the cards 10 or 13 from their input stacks and to retain them in the peripheral channel 38.

A construction similar to that described above can be used for the transporting drum 16. Such a construction will enable the drum 16 to draw cards from the input stacks 11 and 12 and to transport the cards on its periphery.

A gate generally indicated as 130 in Figures 1, 7, 8 and 9 is disposed in contiguous relationship to the drums 16 and 20. The gate 130 is disposed relative to the drum 16 at an angular position displaced from the input stacks 12 and 11 in the direction of rotation of the drum and between the input stack 11 and the output stack 174. Since the drum 16 is shown in Figure 1 as rotating in a clockwise direction, the gate 130 is displaced in this direction from the input stacks 12 and 11. The gate 130 is pivotable into three different positions in a manner which will be described in detail subsequently.

As shown in Figures 7, 8 and 9, the gate 130 includes a base 132 (Figure 9) which supports a C-shaped brace 134 by means of a plurality of threaded studs 136. A pivot pin 138 extends through a rod 140 and through the horizontal legs of the brace 134. A first spring 142 is supported between the rod 140 and a fixed wall such as that indicated at 144 in Figure 7. Similarly, a second spring 146 is supported between the rod 140 and a fixed wall 148. The springs 142 and 146 are disposed on opposite sides of the rod 140 so that one of the springs will be subjected to tension by a lateral movement of the rod 140 at the same time that the other spring is subjected to a compressional force.

A post 152 is fixedly positioned on the pivot pit 138 by studs 156 which screw into the post to press against the pin. At its outer end, the post 152 supports fingers 160 which taper as at 161 on one side and as at 162 on the opposite side, preferably on a symmetrical basis. In this way, the fingers 160 will be disposed to provide in one pivotal position a coupling from the drum 16 to the drum 20 in a manner similar to that shown in Figure 7. In a second pivotable position, the fingers 160 may be disposed to provide a coupling from the drum 20 to the drum 16. The fingers 160 may also be positioned in a third position in which the drums 16 and 20 become uncoupled from each other. This third position may be desired in certain instances where a card on the drum may rotate through more than one revolution on the drum before information becomes transferred to or from the card.

The rod 140 carries an armature 163 at its left end. The armature 163 is positioned in magnetic proximity with a magnet 164 to pivot the rod 140 in a clockwise direction and move the fingers 160 against the drum 20 when the magnet 164 is energized. In like manner, the armature 163 is positioned in magnetic proximity with a magnet 166 to pivot the rod 140 in a counterclockwise direction and move the fingers 160 against the drum 16 when the magnet 166 is energized. The magnets 164 and 166 are energized by electric currents in the coils 168 and 170 wound on the respective magnets. Whenever neither of the magnets 164 or 166 is energized, the springs 142 and 146 bias the rod 140 and fingers 160 to a neutral position between the drums 16 and 20 as shown in Figure 9.

By suitable control of the apparatus described in the preceding paragraphs, the following operation may be obtained: A master card 10 is first released from the input stack 12 and is circulated around the periphery of the transporting drum 16. The gate 130 is then pivoted from its neutral position (Figure 9) to its position adjacent the drum 16 (Figure 7), this being achieved by passing current through the coil 170. The gate now functions to transfer the master card to the periphery of the drum 20. The gate may then be returned to its neutral position by the interruption of the current in the coil 170. The master card is then circulated by the drum 20 past a series of transducer read heads which are positioned adjacent this drum. These heads read the information on the master card and cause it to be recorded by suitable write heads on the magnetic drum 21.

The gate 160 is then pivoted from its neutral position to its position adjacent the periphery of the drum 20 by passing a current through the coil 168. This enables the master card to be transferred back to the periphery of the drum 16 after it has been processed by the various heads contiguous to the drum 20. The master card is then carried by the drum 16 to the output stack 174 and is deposited in the output stack by the stop 176.

At the completion of the operations described above, a slave card 13 is transferred from the input stack 11 to the periphery of the rotatable drum 16 and is transported by the drum to the gate 160. The gate 160 is again moved to its position adjacent the periphery of the drum 16 to transfer the slave card to the peripheral surface of the drum 20. The system then operates in a manner to be described to line up the slave card and the data recorded on the magnetic drum 21 from the information on the master card. The data on the magnetic drum is then recorded on the slave card. After the data has been recorded on the slave card, the slave card is returned to the drum 16 by positioning the gate 160 against the drum 20 in the described manner. The slave card is then deposited in the output stack 174 by the stop 176.

One purpose of the invention is to transfer the data recorded on the drum 21 to a series of slave cards. To achieve this, the transfer mechanism of the input stack 11 is controlled so that a predetermined number of slave cards are successively fed to the drum 16, transferred to the transporting drum 20 for processing, and then deposited in the output stack 174. The information on the original master card is duplicated in this way on each of these slave cards. After a particular number of slave cards have been so processed, the operation of the apparatus becomes automatically interrupted so that the next master card can be transferred to the drum 16.

A master card 10 supported on the periphery of the drum 20 is shown, for example, in the developed view of Figure 10. As this card is transported around the drum 20 in a counterclockwise direction, it first reaches a series of magnetic transducer heads such as the read head 380. This head reads the information on the top row of the card. In actual practice, additional read heads will be associated with the head 380 to read the information from other rows on the card 10. These heads may be aligned with the head 380. It is evident that as many such read heads may be used as there are rows of information on the card. However, only the read head 380 is shown since the others are merely duplications. A read head 381 is axially aligned with the head 380. The function of the head 381 is to read the start indication contained at the lower left hand corner of each master card 10 and of each slave card 13.

A group of transducer write heads such as the head 384 are also positioned adjacent the drum 20 in the direction of rotation from the head 380. As in the case of the read heads, such as the head 380, there will be as many write heads such as the head 384 as there are rows of information of the card 10. The write heads such as the head 384 may be axially aligned with one another. A read head 382 is axially aligned with the head 384 and is positioned, like the head 381, to read the start indication in the lower row of the card.

The function of the write head 384 is to write or reproduce onto each of the slave cards data from the magnetic drum 21 which was previously read from the master card by the head 380. The head 384 is spaced from the head 380 a predetermined distance which will be assumed to be 3³⁄₃₂″ for the purposes of the present description. Also for purposes of description, the distance around the circumference of the drums 20 and 21 will be assumed to be 25⅛″. Each position on the cards 10 and 13 will be assumed to be spaced by ³⁄₃₂″. Therefore, there will be 268 positions around the circumference of the transporting drum 20 and around its associated coaxial magnetic drum 21.

As previously pointed out, the data is recorded on the magnetic drum 21 in a series of adjacent peripheral channels spaced axially along the drum. One of these channels will be designated as a "buffer channel" 376 (Figure 10). This buffer channel carries recordings of the "start" information read from the first position of the bottom row of the cards by the read head 381. Adjacent the buffer channel on the magnetic drum 21 there are a series of channels which shall be designated collectively as the "signal channel" 377. The signal channel carries recordings of the information from the master card as read, for example, by the head 380. Then, adjacent the signal channel on the drum 21 is a "clock channel" 378 which bears a recorded "1" for each of the 268 positions around the drum.

Adjacent the magnetic drum 21 and associated with the buffer channel 376 is a first transducer write head 386 in axial alignment with the heads 380 and 381. A second transducer write head 388 is associated with the buffer channel 376, and this latter head is spaced a distance of ³⁄₃₂″ (or one position) from the write head 386 in the direction of rotation of the drum 21. A third transducer write head 390 is associated with the buffer channel 376 and is spaced from the write head 388 by ⁶⁄₁₆ of an inch (or two positions) against the direction of rotation of the drum 21. Further transducer write heads 392, 394 and 396 are associated with the buffer channel 376 and are spaced from the write head 388 against the direction of rotation and by respective distances of ⅜″, ¾″ and 1½″ (or four positions, eight positions and sixteen positions, respectively).

A number of adjacent channels are allotted in the signal channel 377 of the drum 21 corresponding to the number of rows of information on the card 10. For purposes of clarity, only one such channel will be described since the others are mere duplications. A transducer write head 385 is positioned adjacent this channel in axial alignment with the head 386 in the buffer channel. Additional transducer write heads 387, 391, 393, 395 and 397 are also associated with the signal channel 377 of the drum 21; and these heads are in respective axial alignment with the transducer write heads 388, 390, 392, 394 and 396 associated with the buffer channel 376.

It should be appreciated that various heads specified to be in aligned relationship in this specification need not be in alignment provided that the information in corresponding channels is shifted by an amount corresponding to the shift in the heads. Such a shift in the positioning of the various heads may sometimes be desired to produce an increased spacing between the heads.

It should also be appreciated that the heads shown as being in one channel may be disposed in more than one channel so as to increase the spacing between the heads. When two or more channels are used, appropriate circuitry can be included to produce the desired operative co-operation between the different channels and the heads in the channels.

A transducer read head 398 is also positioned in the buffer channel 376 of the magnetic drum 21, and this head is displaced a distance of three inches or thirty-two positions from the head 388 in the direction of rotation of the drum 21. The head 398 is axially aligned with the heads 384 and 382 adjacent the drum 20. A transducer read head 399 is positioned adjacent the drum 21 in axial alignment with the head 398. The heads 398 and 399 are respectively associated with the buffer channel 376 and the signal channel 377. Only the read head 399 and the erase head 372 are shown as being in the signal channel. Actually, at least one read head and at least one erase head can be associated with each channel generally defined as the signal channel 377. A transducer read head 374 is positioned adjacent the clock channel to read the clock indications in that channel.

A control system is shown in Figure 11 for causing master and slave cards to be selected from their respective stacks and to be transported from the drum 16 to the drum 20 for processing by the transducer heads of Figure 10. The control system of Figure 11 includes a one-shot multivibrator 402 which may be constructed in a manner similar to that described on pages 2–44 to 2–58, inclusive, of "Principles of Radar" (Second edition), published in 1946 by the staff of the Massachusetts Institute of Technology.

The multivibrator 402 has an input terminal connected to one contact of a manually operated push-button switch 404. The other contact of this switch is connected to ground. When the switch 404 is manually actuated, the multivibrator 402 is triggered to produce at its left output terminal a positive pulse having a duration dependent upon the parameters of the multivibrator. The left output terminal of the multivibrator 402 is connected to the right input terminal of the flip-flop 262 (mentioned earlier in this specification) and is also connected through a delay line 406 to the left input terminal of the flip-flop 262. The flip-flop 262 controls the transfer of a master card 10 from the input stack 12 to the drum 16.

It should be pointed out that the units which shall be referred to subsequently as "or" networks, "and" networks and "flip-flops" are well understood in the computer art and a detailed description of these units is not believed necessary here. An "or" network is usually made up of a series of interconnected diodes and is designed to pass to a common output terminal any one of a plurality of signals that might be impressed on its input terminals. An "and" network is also usually composed of a plurality of interconnected diodes. These diodes are appropriately connected to pass a signal to a common output terminal of the network only when all of a plurality of signals are simultaneously impressed on all of the various input terminals of the "and" network.

A "flip-flop" circuit is a bistable network which may be triggered to a "false" state by the trailing edge of a positive pulse introduced on its right input terminal and which may be triggered to a "true" state by the trailing edge of a positive pulse introduced on its left input terminal. When the flip-flop is in its "true" state, it produces a relatively high voltage on its left output terminal and a relatively low voltage on its right output terminal. Conversely, when the flip-flop is in its "false" state, it produces a relatively low output voltage on its left output terminal and a relatively high output voltage on its right output terminal. As previously noted, the flip-flop circuit has bistable characteristics and will remain in either one of its two states until triggered to the other.

The left output terminal of the multivibrator 402 is further connected through an "or" network 408 and through a delay line 410 to the left input terminal of a flip-flop 412. The output terminal of the delay line 410 is connected to the input terminal of a further delay line 414, and the output terminal of the latter delay line is connected to the right input terminal of the flip-flop 412. The output terminal of the delay line 410 is also connected to an "and" network 416. The output terminal of the multivibrator 402 is also connected to the left input terminal of a flip-flop 418, and it is connected through a delay line 420 to the right input terminal of this flip-flop. The left output terminal of the flip-flop 418 is connected to the "and" network 416.

The output terminal of the "and" network 416 is connected through a delay line 422 to the left input terminal of a flip-flop 424. The left output terminal of the flip-flop 424 is connected to an "and" network 426 whose output terminal is connected to the left input terminal of a flip-flop 428. The output terminal of the "and" network 426 is also connected back to the right input terminal of the flip-flop 424.

The read head 381 (Figure 10) which as previously pointed out, indicates the start of a card, is connected to an amplifier 430; and this amplifier is, in turn, connected to the "and" network 426 and to the left input terminal of a flip-flop 449. The "and" network 426 is connected to an "or" network 432, and this "or" network is connected to the write head 386 in the buffer channel 376 of the magnetic drum 21 (Figure 10). The read head 380 associated with the drum 20 (Figure 10) is connected to an amplifier 434, and the amplifier is connected to an "and" network 436 are applied through an "or" network flop 428 is connected to an input terminal of the "and" network 436. The signals on the output terminal of the "and" network 426 are applied through an "or" network 438 to the write head 385 in the signal channel 377 of the magnetic drum 21 (Figure 10).

The signals from the read head 374 associated with the clock channel 378 of the drum 21 are applied to the left input terminal of a flip-flop 440 and through a delay line 442 to the right input terminal of this flip-flop. The left output terminal of the flip-flop 428 is also connected to an "or" network 444, and this "or" network is connected to an "and" network 446. The left output terminals of the flip-flops 440 and 449 are also connected to the "and" network 446. The output terminal of the "and" network 446 is connected to a counter 448. This counter may be constructed in accordance with well-known binary counter principles, and it produces a positive pulse at its output terminal at the termination of a selected count. This output pulse corresponds to the last position on the master or slave card being processed and represents the end of such cards. The output terminal of the counter 448 is connected to the right input terminal of the flip-flop 428 and to the right input terminal of the flip-flop 449.

The right output terminal of a flip-flop 450 is also connected to the "and" network 446 through the "or" network 444. The operation of the flip-flop 450 will be more fully described. For the present it is believed sufficient to state that this flip-flop is triggered to its "false" state to produce a relatively high voltage at its right output terminal at the start of the transfer of information from the magnetic drum 21 to an aligned slave card. This flip-flop then remains in its "false" state until a shifting operation with respect to the next succeeding slave card is initiated.

The left output terminal of the flip-flop 412 is connected to the control grid of a tube 452. The control grid of this tube is also connected to a resistor 466 which is connected to the negative terminal of the source 272. This latter connection places a negative bias on the control grid so that the tube 452 is nonconductive except when the flip-flop is triggered to its "true" state. The cathode of the tube 452 is connected to ground, and the anode of this tube is connected to one terminal of the coil 170 associated with the gate 130 which was previously described in conjunction with Figures 1, 7, 8 and 9. A resistor 454 is connected between the other terminal of the coil 170 and the positive terminal of the source 272 of positive voltage. As previously noted, a flow of current through the coil 170 causes the gate 130 to pivot against the drum 16 to transfer cards from the drum 16 to the drum 20. Such a flow of current is initiated whenever the tube 452 is conductive and is terminated whenever the tube 452 is nonconductive.

The counter 448 is also connected to the right input terminal of the flip-flop 263. As previously described, this flip-flop controls the transfer mechanism of the slave input stack 11 so that a slave card is transferred from the stack 11 to the peripheral channel of the drum 16 whenever the flip-flop is triggered to its false state. The counter 448 is further connected through a delay line 456 to the left input terminal of the flip-flop 263 to return the flip-flop to its "true" condition immediately after a single card has been selected by the drum 16 and before more than one card is transferred to the drum.

The flip-flop 263 is also used to pivot the gate 130 against the drum 20 to position the gate so that it may transfer cards from the drum 20 to the drum 16. For this purpose, the right output terminal of the flip-flop 263 is connected to the control grid of a tube 460. The cathode of the tube 460 is connected to ground and the anode of this tube is connected to one terminal of the coil 168 of the control mechanism for the gate 130 and which was previously described in conjunction with Figures 1, 7, 8 and 9. As previously described, a flow of current through the coil 168 causes the gate to be pivoted from its neutral position against the drum 20 to transfer cards from the drum 20 to the drum 16.

A resistor 462 is connected between the other terminal of the coil 168 and the positive terminal of the source 272 of direct voltage. A resistor 464 is connected between the control grid of the tube 460 and the negative terminal of the source 272 of direct voltage. The resistor 464 causes the tube 460 to be biased to a nonconductive state so that normally no current flows through the coil 168. However, this condition is overcome and the tube 460 becomes conductive whenever the flip-flop 263 is triggered to its "false" state.

The counter 448 is also connected through a delay line 488 to a second counter 480 which in turn is connected to the left input terminal of a flip-flop 482. The counter 480 like the counter 440, may be constructed in accordance with known binary counter techniques. The right input terminal of the flip-flop 482 is connected to the output terminal of the multivibrator 402. The left output terminal of the flip-flop 482 is connected to the "or" network 489, and the right output terminal of this flip-flop is connected to the "and" network 486.

The left output terminal of the flip-flop 482 is also connected to an "and" network 481 and a source 483 of erase signals is additionally connected to this "and" network. The "and" network 481 is connected through an "or" network 485 to the erase heads 370 and 372 of Figure 10.

To initiate the control system of Figure 11, the push button 404 is manually depressed and released. This causes the multivibrator 402 to introduce a positive pulse to the right input terminal of the flip-flop 262 to trigger that flip-flop to its "false" state. A relatively high output voltage now appears on the right output terminal of the flip-flop 262 and a relatively low voltage appears at the left output terminal of this flip-flop. In the manner previously described, this causes the tube 276 to be conductive and the tube 268 to be nonconductive so that a master card 10 is released from the master stack 12 onto the peripheral channel of the drum 16. The pulse from the multivibrator passes through the delay line 406 to the left input terminal of the flip-flop 262 to return the flip-flop to its "true" state in time to prevent more than one master card from being released by the input stack 10 to the drum 16.

The master card 10 withdrawn by the drum 16 from the input stack 12 now circulates on the drum 16 toward the gate 130. Just before the master card 10 reaches the gate 130, the pulse from the multivibrator 402 passes through the "or" network 408 and through the delay line 410 to trigger the flip-flop 412 to the "true" state of operation. The triggering of the flip-flop 412 to its "true" state produces a relatively high voltage at its left output terminal and this voltage is introduced to the control grid of the tube 452. The tube 452 is normally biased to a nonconductive state but is rendered conductive when the flip-flop 412 is triggered to its "true" state.

When the tube 452 becomes conductive, current flows in the coil 170 to pivot the gate 130 against the drum 16 in the manner described. The gate 160 is, therefore, in a position to strip the master card 10 from the peripheral channel of the drum 16 and to transfer it to the peripheral channel of the drum 20. When this operation is completed, the pulse from the delay line 414 returns the flip-flop 412 to its "false" state. This produces a relatively low voltage at the left output terminal of the flip-flop 412 and the tube 452 returns to its nonconductive state so as to terminate the current flow in coil 170. This termination of the current flow in the coil 170 causes the gate 160 to return to its neutral position intermediate the drums 16 and 20 in the manner described. The master card 10 now circulates past the various transducer heads disposed adjacent the drum 20 so that its information may be read and recorded on the magnetic drum 21.

The pulse from the multivibrator 402 also triggers the flip-flop 418 to the "true" state of operation to impress a relatively high voltage on the "and" network 416. This voltage conditions the "and" network 416 to pass the pulse from the delay line 410 to the delay line 422. The pulse passes through the delay line 422 and triggers the flip-flop 424 to its "true" state just before the master card 10 is circulated on the drum 20 to the read head 380. After the flip-flop 424 has been so triggered to its "true" state, the pulse from the multivibrator 402 passes through the delay line 420 to the right input terminal of the flip-flop 418 to return this flip-flop to is "false" state. The flip-flop 418 and the "and" network 416 are included in the system so that the flip-flop 424 is triggered to its "true" state only for a master card and upon the manual actuation of the push button 404. For all subsequent slave cards, the flip-flop 424 remains in its "false" state.

The actuation of the flip-flop 424 to its "true" state causes a relatively high voltage to be introduced to the "and" network 426 to condition this network for the passage of an output signal from the amplifier 430 through the "and" network to the flip-flop 428. As soon as the first position of the master card 10 reaches the read head 381, the amplifier 430 translates a positive pulse corresponding to the representation "1" in the bottom row of the card. As previously described, this pulse indicates the start of the card. This pulse passes through the "and" network 426 and triggers the flip-flop 428 to its "true" state to produce a relatively high voltage on the left output terminal.

The pulse from the "and" network 426 is also introduced to the right input terminal of the flip-flop 424 to return the flip-flop to the "false" state. This pulse also passes through the "or" network 432 to the write head 386 in the buffer channel 376 of the magnetic drum 21 such that a positive magnetic pulse ("1") is recorded in that channel to indicate the start position of the information from the master card on the magnetic drum 21. The pulse from the amplifier 430 also triggers the flip-flop 449 to the "true" state.

The triggering of the flip-flop 428 to the "true" state conditions the "and" network 436 for the passage of signals read by the head 380. The read head 380 reads the information in the first row of the card 10 as the card is transported by the drum 20 past that head. The resulting signals from the read head 380 are amplified in the amplifier 434 and passed to the "and" network 436. The signals pass through this "and" network through the "or" network 438 to the write head 385. The head 385, therefore, records the information from the master card in the signal channel 377 on the magnetic drum. Therefore, the information on the master card is now recorded on the magnetic drum 21 by the head 385. As previously described, the starting position of this information is indicated by the magnetic pulse recorded in the buffer channel 376 of the drum 21 by the write head 386.

The triggering of the flip-flops 428 and 449 to their "true" states also conditions the "and" network 446 for translation. This follows because the relatively high voltage from the left output terminal of the flip-flop 428 is introduced to the "and" network 446 through the "or" network 444, and the relatively high voltage from the left output terminal of the flip-flop 449 is directly introduced to the "and" network 446.

As the magnetic drum 21 rotates, the magnetic clock pulses recorded in the clock channel 378 of that drum are read by the head 374 and each such pulse triggers the flip-flop 440 to its "true" state. Each clock pulse also passes through the delay line 442 to return the flip-flop 440 to its "false" state before the next succeeding clock pulse is produced by the head 374. The flip-flop 440 produces, therefore, a series of accentuated clock pulses at its left output terminal respectively corresponding to the successive positions on the master card.

The clock pulses from the flip-flop 440 are passed through the "and" network 446 since the "and" network is conditioned for translation by the flip-flops 428 and 449. The clock pulses passing through the "and" network 446 are introduced to the counter 448. The counter 448 may be any well-known binary counter. The counter 448 is designed to produce a pulse at its output terminal upon the completion of a count corresponding to the total number of positions on the master card 10. This output pulse from the counter 448, therefore, represents the end of the recording of the information from the master card 10 onto the magnetic drum 21.

The output pulse from the counter 448 is introduced to the right input terminal of the flip-flops 428 and 449 to return both these flip-flops to their "false" states. The "and" networks 436 and 446 are then no longer conditioned for translation, and the circuit from the read head 380 to the write head 385 is interrupted, as is the circuit from the clock flip-flop 440 to the counter 448. As noted above, this latter set of conditions represents the termination of the reading of the information on the master card.

The output pulse from the counter 448 is also impressed on the right input terminal of the flip-flop 263 to trigger the flip-flop to its "false" state. This produces a relatively high voltage on the right output terminal of the flip-flop 263 to render the tube 460 conductive so that a current flow is initiated through the winding 168 of the gate 130. The current flow in the winding 168 pivots the gate 130 from its neutral position between the drums 16 and 20 to a position adjacent the periphery of the drum 20. This enables the master card 10 to be stripped by the gate 130 from the drum 20 and transferred back to the drum 16. The master card 10 is now transported on the drum 16 to the output stack 174 (Figure 1) in which it is deposited.

After the master card has been transferred to the drum 16, the pulse from the counter 448 passes through the delay line 456 to return the flip-flop 263 to the "true" state of operation. This terminates the current flow through the tube 460 and through the coil 168 so that the gate 130 is returned to its neutral position between the drums 16 and 20.

The relatively high voltage on the right output terminal of the flip-flop 263 in the false state of operation of the flip-flop is introduced to the "and" network 486. A relatively high voltage is also introduced to the "and" network 486 from the right output terminal of the flip-flop 482 since the flip-flop has previously been triggered to its false state a particular time after the button 402 has been manually depressed. The flip-flop 482 is triggered to its false state at the time that the flip-flop 402 returns to its false state of operation after being triggered to its true state upon the depression of the button 404.

Since relatively high voltages are simultaneously introduced to the "and" network 486 from the flip-flop 263 and the multivibrator 402, a sufficiently high voltage passes to the grid of the tube 277 to make the tube conductive. This causes current to flow through a circuit including the arm 241 and the tube 277. Because of the flow of current through the arm 241, a slave card 13 becomes transferred from the input stack 11 to the drum 16 in a manner similar to that previously described.

The flip-flop 263 is returned to its "true" state by the pulse from the delay line 456. This occurs in time for the tube 277 to be rendered nonconductive after the selection of only one slave card from the input stack 11 and to prevent the transfer of any further slave cards to the drum 16 until another cycle of operation has been initiated. The slave card 13 now circulates on the drum 16 toward the gate 130.

The output pulse from the counter 448 is impressed through the "or" network 408 on the delay line 410 and the output pulse from this delay line triggers the flip-flop 412 to its "true" state again to pivot the gate 130 to its position adjacent the drum 16. This occurs in time for the slave card 13 to be stripped from the drum 16 by the gate 130 and transferred to the drum 20. After the transfer has taken place, the pulse passes through the delay line 414 to return the flip-flop 412 to its "false" state. The flip-flop 412 in its "false" state causes the gate 160 to be returned to its neutral position in the manner previously described. Because the flip-flop 418 is now in its "false" state, the "and" network 416 does not pass to the delay line 422 the pulse introduced to it from the delay line 410.

The slave card now circulates on the drum 20 toward the read heads 380 and 381. When the card reaches the head 381, the start indication on the bottom row of the slave card at the lower left-hand corner of the card is read by the head 381. This causes the flip-flop 449 to be triggered to its "true" state. No other circuit is completed for this start indication because the "and" network 426 is not conditioned for translation due to the "false" state of the flip-flop 424. The pulse from the read head 381 corresponding to the start indication on the slave card, therefore, does not reach the write head 386. Also, because the "and" network 426 is not conditioned for translation, the pulse from the read head 381 is not impressed on the flip-flop 428. Because of this, the flip-flop 428 remains at its "false" state so that no circuit is established from the read head 380 through the "and" network 436 or from the clock flip-flop 440 through the "and" network 446.

A recording of the information from the master card now exists on the signal channel 377 of the magnetic drum 21 and there is also a recording in the buffer channel 376 indicating the start position of the data in the signal channel. Each time the data in the signal channel 377 reaches the read head 399, and in a manner to be described, it is fed to and successively rerecorded by one of the write heads 385, 387, 391, 393, 395 and 397 in that channel so that the data may be shifted by increments around the magnetic drum 21 until it is aligned with the position of the slave card on the transporting drum 20. When such alignment is achieved, the first position of the data in the signal channel 377 of the magnetic drum 21 reaches the read head 399 at the same time as the first position of the slave card on the transporting drum 20 reaches the write head 384. The information from the read head 399 is now directed to the write head 384 and recorded on the slave card. This shifting operation begins as soon as the slave card reaches the read head 382 and continues until all of the information has been recorded on the slave card 13. All of the operations described in this paragraph will be described in detail subsequently.

When the recording operation on the slave card 13 begins, the flip-flop 450 (Figure 11) is triggered to its "false" state in a manner to be described so that a relatively high voltage appears at its right output terminal. This voltage from the right output terminal of the flip-flop 450 is impressed on the "and" network 446 through the "or" network 444. Therefore, because of the true state of the flip-flop 449, the "and" network 446 is again conditioned to pass the clock pulses from the flip-flop 440 to the counter 448, the flip-flop 449 being triggered to its "true" state by the slave card as previously noted. The counter 448 now counts the number of clock signals and produces an output pulse at the time that the trailing end of the card 13 is moving past the write head 384. This pulse triggers the flip-flop 449 to its false state so that the "and" network 446 no longer passes clock pulses to the counter 448.

The pulse from the counter again triggers the flip-flop 263 to the "false" state of operation. This causes the tube 460 once more to become conductive such that the gate 130 becomes pivoted from its neutral position to its position adjacent the drum 20. The slave card, which now bears a duplicate of the information on the master card, travels around the drum 20 to the gate 130 where it is stripped from the drum 20 and transferred to the drum 16. The slave card now continues its journey to the output stack 174 (Figure 1). As before, the pulse through the delay line 456 returns the flip-flop 263 to its "true" state and the gate 130 is returned to its neutral position after the slave card has become transferred from the drum 20 to the drum 16.

The triggering of the flip-flop 263 to its false state also reverses the conductivity of the tubes 269 and 277 in the manner described previously to release a second slave card from the input stack 11. The second slave card now undergoes the same series of operations as the first so that the information from the master card can also be duplicated on it. This duplication can be repeated for as many slave cards as desired. Each time a duplication on a slave card is made, the counter 448 introduces a pulse through the delay line 488 to the counter 480.

The counter 480 is set to produce an output pulse after the desired number of duplications have been made. This output pulse from the counter 480 triggers the flip-flop 482 to the "true" state of operation. This introduces a relatively high voltage on the control grid of the tube 269 through the "or" network 489 and holds that tube conductive. Also, when the flip-flop 482 is triggered to its "true" state, a relatively low voltage is impressed on the "and" network 486 so that the network is no longer conditioned to pass signals to the grid of the tube 277. This prevents any further slave cards 13 from being released from the input stack 11 after a particular number of cards have had information duplicated on them. The particular number of cards is dependent upon the setting of the counter 480.

As long as the flip-flop 482 remains in its true state, the slave cards are retained in the input stack 11. Therefore, no further slave cards can be removed from the stack 11 until the next complete cycle of operations are initiated by a depression of the push button 404. Depression of the push-button returns the flip-flop 482 to its "false" state and the transfer of cards from stack 11 can once more be controlled by the flip-flop 263.

The flip-flop 482 in its "true" state conditions the "and" network 481 to pass erase signals from the source 483 to the erase heads 370 and 372. These heads remove the recorded data from the magnetic drum 21 to clear the drum for the next cycle of operation. The apparatus is now in a condition to receive a second master card for duplication on a second multiplicity of slave cards. The cycle of operations described above may be initiated for the second master card and succeeding slave cards merely by manually depressing the push-button switch 104.

It is believed that a person skilled in the art would be able to include stages for producing an automatic release of the next master card without a depression of the button 404. These stages would also operate to set the counter 480 to the initial count so that the particular number of slave cards would be automatically released from the stack 11 after the information on the second master card has become transferred to the magnetic drum 21.

The invention includes a control system for reading the information on the master card and for recording that information on the magnetic drum 21, for then shifting the information on the magnetic drum by successive increments until it is lined up with the succeeding slave card, and for then automatically feeding the information to the slave card. This control system is illustrated in Figures 12 to 14, inclusive.

With reference now briefly to Figure 14, it can be seen that the counter 448 of Figure 11 is also connected to the left input terminal of a flip-flop 702 which is the start flip-flop of the system. An amplifier 431 is connected to the read head 382 in the buffer channel 376 of the magnetic drum 21, and this amplifier amplifies the start signal (N) of the slave card as read by this head. The amplifier 431 is connected to an "and" network 704 and the left output terminal of the flip-flop 702 is also connected to this "and" network. The "and" network 704 is connected to the left input terminal of a flip-flop 706 (M).

The read transducer head 398 which reads the information (DR) in the buffer channel 306 of the magnetic drum 21 is connected to an amplifier 708, and this amplifier is connected to the right input terminal of the flip-flop 706. The left output terminal of the flip-flop 706 is connected to an "and" network 710, and this "and" network is connected to the right input terminal of the flip-flop 702.

The left output terminal of the flip-flop 706 is also connected to the "and" network 710. The amplifier 708 is also connected to the left input terminal of a flip-flop 712 (B). The left output terminal of the flip-flop 712 is connected to an "and" network 714. The clock flip-flop 440 (C) of Figure 11 is also connected to the "and" network 714, and the output terminal of this "and" network is connected to a counter 716 ($D^1$). The counter 716 may be of known construction and is connected to the right input terminal of the flip-flop 712.

The amplifier 708 is connected to an "and" network 718 which is connected to the left input terminal of the flip-flop 450 (L). The amplifier 708 is also connected to an "and" network 720 and the output terminal of the "and" network 720 is connected to the right input terminal of the flip-flop 450. The left output terminal of the flip-flop 450 is also connected to the "and" network 720 and to the "and" network 710.

Turning now to Figure 12, it will be seen that the portion of the control system illustrated in this figure includes a series of flip-flops 502 (A1), 504 (A2), 506 (A3), 508 (A4) and 510 (A5). The left output terminal of the flip-flop 706 of Figure 14, the left output terminal of the clock flip-flop 440 of Figure 11 and the right output terminal of the flip-flop 450 are all connected to an "and" network 512, and this "and" network is connected to a cathode follower 514 (MLC). The cathode follower is connected to an "and" network 516, and this "and" network is connected to the left input terminal of the flip-flop 502. The right output terminal of the flip-flop 502 is also connected to the "and" network 516.

The amplifier 431 (N) of Figure 14, the left output terminal of the flip-flop 702 of Figure 14, and the right output terminal of the flip-flop 450 are connected to an "and" network 518. The "and" network 518, in turn, is connected to a cathode follower 520 (NLS). The left output terminal of the flip-flop 502 is connected to an "and" network 522, and the cathode follower 514 is also connected to this "and" network. The "and" network 522 is connected through an "or" network 524 to the right input terminal of the flip-flop 502. The cathode follower 514 is further connected to an "and" network 526 which is connected to the left input terminal of the flip-flop 504. The right output terminal of the flip-flop 502 is also connected to the "and" network 526 as is the right output terminal of the flip-flop 504.

The cathode follower 520 is connected through an "or" network 528 to the right input terminal of the flip-flop 504. The cathode follower 514 is further connected to an "and" network 530, and the right output terminal of the flip-flop 502 and the left output terminal of the flip-flop 504 are also connected to this "and" network. The "and" network 530 is also connected through the "or" network 528 to the right input terminal of the flip-flop 504.

The cathode follower 514 is further connected to an "and" network 532; and the right output terminal of the flip-flop 502, the right output terminal of the flip-flop 504 and the right output terminal of the flip-flop 506 are also connected to this "and" network. The "and" network 532 is connected through an "or" network 534 to the left input terminal of the flip-flop 506. The cathode follower 520 is also connected through the "or" network 534 to the left input terminal of the flip-flop 506. The cathode follower 514 is further connected to an "and" network 536. The right output terminal of the flip-flop 502, the right output terminal of the flip-flop 504 and the left output terminal of the flip-flop 506 are also connected to the "and" network 536. The "and" network 536 is connected through an "or" network 538 to the right input terminal of the flip-flop 506.

The cathode follower 514 is connected to an "and" network 540, and the right output terminals of the flip-flops 502, 504, 506 and 508 are also connected to this "and" network. The "and" network 540 is connected through an "or" network 542 to the left input terminal of the flip-flop 508. The cathode follower 514 is also connected to an "and" network 544. The right output terminals of the flip-flops 502, 504 and 506 are also connected to the "and" network 544 as is the left input terminal of the flip-flop 508. The "and" network 544 is connected through an "or" network 546 to the right input terminal of the flip-flop 508. The cathode follower 520 is also connected through the "or" network 542 to the left input terminal of the flip-flop 508.

The cathode follower 514 is connected to an "and" network 548, and the right output terminals of the flip-flops 502, 504, 506, 508 and 510 are also connected to this "and" network. The "and" network 548 is connected to the left input terminal of the flip-flop 510. The cathode follower 514 is also connected to an "and" network 550, as is the left output terminal of the flip-flop 510 and the right output terminals of the flip-flops 502, 504, 506 and 508. The "and" network 550 is connected through an "or" network 552 to the right input terminal of the flip-flop 510. The cathode follower 520 is also connected through the "or" network 552 to the right input terminal of the flip-flop 510.

The left output terminal of the flip-flops 502, 504, 506, 508 and 510 are all connected through an "or" network 554 to a cathode follower 556 ($G_1$). The right output terminals of the flip-flops 502, 504, 506, 508 and 510 are all connected to an "and" network 558, and this "and" network is connected to a cathode follower 560 ($\bar{G}_1$).

The left output terminal of the flip-flop 450 and the output terminal of the counter 716 are connected to an "and" network 570 which in turn is connected to an "and" network 572. The left output terminal of the flip-flop 502 is also connected to the "and" network 572, and the output terminal of the "and" network 572 is connected through the "or" network 524 to the right input terminal of the flip-flop 502.

The "and" network 570 is further connected to an "and" network 574. The right output terminal of the flip-flop 502 is also connected to the "and" network 574, as is the left output terminal of the flip-flop 504. The output terminal of the "and" network 574 is connected through the "or" network 528 to the right input terminal of the flip-flop 504. The "and" network 570 is further connected to an "and" network 576. The right output terminals of the flip-flops 502 and 504 are connected to the "and" network 576, and the left output terminal of the flip-flop 506 is also connected to this "and" network. The "and" network 576 is connected through the "or" network 538 to the right input terminal of the flip-flop 506.

The "and" network 570 is also connected to an "and" network 578. The right output terminals of the flip-flops 502, 504 and 506 are connected to the "and" network 578 and the left output terminal of the flip-flop 508 is also connected to this "and" network. The "and" network 578 is connected through the "or" network 546 to the right input terminal of the flip-flop 508.

The "and" network 570 is also connected to the "and" network 580, as is the right output terminals of the flip-flops 502, 504, 506 and 508. The left output terminal of the flip-flop 510 is also connected to the "and" network 580, and the output terminal of this "and" network is connected through the "or" network 552 to the right input terminal of the flip-flop 510.

Referring now to Figure 13, it will be seen that this portion of the control system contains another series of flip-flops 602 ($A_6$), 604 ($A_7$), 606 ($A_8$) and 608 ($A_9$). The cathode followers 514 (MLC) and 560 ($\bar{G}_1$) are connected to an "and" network 610; this "and" network 610 is connected through an "or" network 612 to a cathode follower 614. The cathode follower 614 is connected to an "and" network 616, and the right output terminal of the flip-flop 602 is also connected to this "and" network. The "and" network 616 is connected to the left input terminal of the flip-flop 602.

The cathode follower 556 ($G_1$) of Figure 12 is connected through an "or" network 618 to an "and" network 620. The left output terminal of flip-flop 450 (L) of Figures 11 and 14 is also connected to the "and" network 620 as is the right output terminal of the counter 716 ($D^1$) of Figure 14. The "and" network 620 is also connected through the "or" network 612 to the cathode follower 614 [$\bar{G}_1 M\bar{L}C+(G_1+G_2)LD^1$]. The "and" network 610 is further connected to an "and" network 622, and the "and" networks 620 and 622 are connected through an "or" network 624 to the "and" network 626. The left output terminal of the flip-flop 602 is also connected to the "and" network 626, and this "and" network is connected through an "or" network 628 to the right input terminal of the flip-flop 602. The cathode follower 520 NLS) of Figure 12 is also connected through the "or" network 628 to the right input terminal of the flip-flop 602.

The cathode follower 614 is also connected to an "and" network 630, as are the right output terminals of the flip-flops 602 and 604. The output terminal of the "and" network 630 is connected to the left input terminal of the flip-flop 604. The cathode follower 614 is also connected to an "and" network 632. The right output terminal of the flip-flop 602 and the left output terminal of the flip-flop 604 are also connected to the "and" network 632. The "and" network 632 and the cathode follower 520 are connected through "or" network 634 to the right input terminal of the flip-flop 604.

The cathode follower 614 is further connected to an "and" network 636, and the right output terminals of the flip-flops 602, 604 and 606 are also connected to this "and" network. The "and" network 636 is connected to the left input terminal of the flip-flop 606. The cathode follower 614 is further connected to an "and" network 638. The right output terminals of the flip-flops 602 and 604 are also connected to the "and" network 638 and the left output terminal of the flip-flop 606 is connected to this "and" network. The "and" network 638 and the cathode follower 520 are connected to the "or" network 640 to the right input terminal of the flip-flop 606.

The cathode follower 614 is connected to an "and" network 642 and the right output terminals of the flip-flops 602, 604, 606 and 608 are also connected to this "and" network. The cathode follower 514 is connected to an "and" network 644. The "and" network 642, the cathode follower 520 and the "and" network 644 are all connected through an "or" network 646 to the left input terminal of the flip-flop 608. The cathode follower 614 is also connected to an "and" network 648. The right output terminals of the flip-flops 602, 604 and 606 are connected to this "and" network, as is the left output terminal of the flip-flop 608.

The left output terminals of the flip-flops 602 and 606 and the right output terminals of the flip-flops 502, 504, 506, 508, 510, 604 and 608 are all connected to an "and" network 650. The "and" network 650 is connected to an "and" network 654. The clock flip-flop 440 of Figure 12 is also connected to the "and" network 654, and the output terminal of this "and" network is connected to the left input terminal of a flip-flop 652 ($G_3$). The output terminal of the "and" network 644 is returned to the right input terminal of the flip-flop 652. The left output terminal of the flip-flop 652 is connected to the "and" network 644. The right output terminal of the flip-flop 652 is connected to the "and" network 620. The right output terminal of the flip-flop 652 is further connected to the "and" network 532 (Figure 12) and to the "and" network 548.

The right output terminals of the flip-flops 602, 604, 606 and 608 are all connected to an "and" network 655, and this "and" network is connected to a cathode follower 656 ($\bar{G}_2$). The left output terminals of the flip-flops 602, 604, 606 and 608 are all connected through an "or" network 658 to a cathode follower 660 ($G_2$). The cathode follower 660 is connected through the "or" network 618 to the "and" network 620. The cathode follower 660 is also connected to the "and" network 570 (Figure 12).

Returning now to Figure 14, it will be seen that the cathode follower 556 ($G_1$) and the cathode follower 660 ($G_2$) are connected through an "or" network 750 to the "and" network 718. The cathode follower 560 ($\bar{G}_1$) and the cathode follower 656 ($\bar{G}_2$) are both connected to the "and" network 720. The read head 399 in the signal channel 377 (Figure 10) of the magnetic drum 21 is connected to an amplifier 752 (LR), and this amplifier is connected to an "and" network 754. The right output terminal of the flip-flop 450 (L) is also connected to the "and" network 754, and the output terminal of this "and" network is connected to the write head 384 ($Q_1$) associated with the transporting drum 20 (Figure 10).

The left output terminal of the flip-flop 502 is connected to an "and" network 756, and the right output terminal of this flip-flop is connected to each of a series of "and" networks 758, 760, 762 and 764. The left output terminal of the flip-flop 504 is connected to the "and" network 758, and the right output terminal of this flip-flop 504 is connected to each of the "and" networks 760, 762 and 764. The left output terminal of the flip-flop 506 is connected to the "and" network 760, and the right output terminal of this flip-flop is connected to each of the "and" networks 762 and 764. The left output terminal of the flip-flop 508 is connected to the "and" network 762 and its right output terminal is connected to the "and" network 764. The left output terminal of the flip-flop 510 is connected to the "and" network 764.

The left output terminal of the flip-flop 450, the left output terminal of the flip-flop 712 and the cathode follower 660 are connected to each of the "and" networks 756, 758, 760, 762 and 764, and these units are also connected to a further "and" network 766. The cathode follower 560 is also connected to the "and" network 766.

The "and" network 756 is connected to an "and" network 768, and the "and" network 768 is connected through the "or" network 432 of Figure 11 to the write head 386 ($D_1$) in the buffer channel 376 of the magnetic drum 21. The "and" network 758 is connected to an "and" network 770, and the "and" network 770 is connected to the write head 390 ($D_2$) in the buffer channel 376. The "and" network 760 is connected to an "and" network 772, and the "and" network 772 is connected to the write head 392 ($D_3$) in the buffer channel. The "and" network 762 is connected to an "and" network 774, and the "and" network 774 is connected to the write head 394 ($D_4$) in the buffer channel. The "and" network 764 is connected to an "and" network 776, and the "and" network 776 is connected to the write head 396 ($D_5$) in the buffer channel. The "and" network 766 is connected to an "and" network 778, and the "and" network 778 is connected to the write head 388 ($D_6$) in the buffer channel.

The amplifier 708 and the cathode follower 660 are connected to an "and" network 780. The "and" network 780 is connected to each of the "and" networks 768, 770, 772, 774, 776 and 778.

The "and" network 756 is connected to an "and" network 782 which, in turn, is connected through the "or" network 438 of Figure 11 to the write head 385 ($L_1$) in the signal channel 377 (Figure 10) of the magnetic drum 21. The "and" network 758 is connected to an "and" network 784 and the output terminal of the latter "and" network is connected to the write head 391 ($L_2$) in the signal channel 377 of the magnetic drum. The "and" network 760 is connected to an "and" network 786 which is connected to the write head 393 ($L_3$) in the signal channel 377. The "and" network 762 is connected to an "and" network 788, and the "and" network 788 is connected to the write head 395 ($L_4$) in the signal channel 377. The "and" network 764 is connected to an "and" network 790 which, in turn, is connected to the write head 397 ($L_5$) in the signal channel. The "and" network 766 is connected to an "and" network 792 which is connected to the write head ($L_6$) in the signal channel. The amplifier 752 from the read head 399 ($L_R$) is connected to each of the "and" networks 782, 784, 788, 790 and 792.

The "and" networks 756, 758, 760, 762, 764 and 766 are each connected through an "or" network 794 to an "and" network 796. The source of erase signals 483 of Figure 11 is also connected to the "and" network 796, and this "and" network is connected through the "or" network 486 to the erase heads 370 ($E_D$) and 372 ($E_L$).

As previously described, information from the master card 10 is recorded in the signal channel 377 of the magnetic drum 21 and a start pulse (D) is recorded in the buffer channel 376 of the magnetic drum. After the information from the master card 10 has been recorded on the drum 21, a slave card 13 is introduced to the drum in a manner similar to that previously described. This slave card has a magnetic pulse at the first position of its bottom row. This slave card may be displaced angularly on the drum 20 from the data recorded on the drum 21. In order to obtain a proper transfer of information from the information recorded on the drum to the slave card 13, the information on the drum must be lined up with the slave card before the data can be transferred from the drum to the card. That is, for the transfer to be made, the slave card must reach the write head 384 ($Q_1$) (Figure 10) at the same time as the recorded information on the magnetic drum reaches the read head 399 ($L_R$).

The data on the magnetic drum 21 is lined up with the slave card on the transporting drum 20 by incrementally shifting the data around the drum 21 against the direction of rotation and toward the angular position of the slave card on the transporting drum 20. This shifting is continued until the desired alignment is achieved. This shifting is carried out by causing the read head 399 ($L_R$) to read the data recorded in the signal channel 377, and then by introducing the resulting signals from that head to a selected one of the write heads 385, 387, 391, 393, 395 and 397 to be re-recorded on the magnetic drum 21 at a different angular location. This operation is repeated until the recorded information has been shifted by a proper pattern of increments to align it with the slave card on the drum 20. Then, the signals from the read head 399 ($L_R$) are fed to the write head 384 ($Q_1$) so that the data may be recorded on the slave card. The write heads 385, 387, 391, 393, 395 and 397 will be referred to in the following description as "shifting" heads.

As previously noted, the shifting heads 385, 387, 391, 393, 395 and 397 are placed at different incremental distances from the read head 399 ($L_R$) so that any pattern of increments may be set up to bring about the desired alignment between the data and the slave card. Purely arbitrarily, and for convenience in the particular example referred to previously, the following distances were used:

Head 399 ($L_R$)—Head 387 3" (32 digital positions). ($L_6$).
Head 399 ($L_R$)—Head 385 3"+$\frac{3}{32}$" (33 digital positions). ($L_1$).
Head 399 ($L_R$)—Head 391 3"+$\frac{3}{16}$" (34 digital positions). ($L_2$).
Head 399 ($L_R$)—Head 393 3"+$\frac{3}{8}$" (36 digital positions). ($L_3$).
Head 399 ($L_R$)—Head 395 3"+$\frac{3}{4}$" (40 digital positions). ($L_4$).
Head 399 ($L_R$)—Head 397 3"+1½" (48 digital positions. ($L_5$).

When the recorded information in the signal channel 377 of the magnetic drum 21 first reaches the read head 399 ($L_R$) at a time that the slave card 13 is displaced angularly on the transporting drum 20 from this information, the introduction of this information to the write head 385 ($Q_1$) would be of no avail. The reason for this is that the slave card is in position to receive information from the head 384 ($Q_1$) only when it reaches that head at the same time the recorded data reaches the head 399 ($L_R$). Therefore, the information read by the read head 399 (LR) is fed recurrently to the shifting heads 385 ($L_6$), 387 ($L_1$), 393 ($L_3$), 395 ($L_7$) and 397 ($L_5$) until the magnetic data in the signal channel 376 (Figure 10) arrives at the read head 399 ($L_R$) at the same time as the slave card arrives at the write head 384 ($Q_1$). The data is then automatically fed to the write head 384 ($Q_1$) so as to be recorded on the slave card.

The above operations are carried out by first counting the angular distance between the start position of the slave card on the transporting drum 20 and the start position of the data on the magnetic drum 21, and by then incrementally shifting the data by repeated reading of the data by the read head 399 ($L_R$) and recording of the data by the shifting heads. The incremental shifts are first carried out between the read head 399 ($L_R$) and the shifting heads 385 ($L_1$), 393 ($L_3$), 395 ($L_4$), 397 ($L_5$) until the angular displacement between the recorded data and the slave card is a multiple of 3" (or 32 positions). Then the shift is carried out repeatedly between the read head 399 ($L_R$) and the write head 387 ($L_6$) until actual alignment is achieved.

The flip-flops 502 ($A_1$), 504 ($A_2$), 506 ($A_3$), 508 ($A_4$), 510 ($A_5$) and 602 ($A_6$), 604 ($A_7$), 606 ($A_8$) and 608 ($A_9$) are so connected to the shifting write heads 385 ($L_1$), 387 ($L_6$), 391 ($L_2$), 393 ($L_3$), 395 ($L_4$) and 397 ($L_5$) that when the flip-flop 502 ($A_1$) is in its "true" state, it completes a circuit to the head 385 ($L_1$) to impart a shift of one position plus a single group of 32 positions to the data recorded on the drum 21. Similarly, when the flip-flop 504 ($A_2$) is in its "true" state, it completes a circuit to the shifting head 391 ($L_2$) to impart a two position shift plus the single group of 32 positions to the data recorded on the magnetic drum. In like manner, when the flip-flop 506 ($A_3$) is in its "true" state, it prepares a circuit to the shifting head 393 ($L_3$) to impart a shift of the single group of 32 positions plus an additional four positions to the recorded data. When the flip-flops 508 and 510 (A₅) are in their "true" states, they prepare circuits to the shifting heads 395 and 397 (L₅). When the flip-flop 508 is in its "true" state, a shift of eight positions plus the single group of 32 positions is obtained in the recorded data. Similarly, a shift of 16 positions plus the additional group of 32 positions is obtained when the flip-flop 510 (A₅) is activated.

The flip-flops 602 (A₆), 604 (A₇), 606 (A₈) and 608 (A₉) all prepare a counter-type circuit to the shifting head 387 (L₆) to shift the data repeatedly between the read head 399 (L_R) and the shifting write head 387 (L₆) until final alignment between it and the slave card is achieved. Each of these latter shifts is through a distance corresponding to a single group of 32 positions. Shifts in the single groups of 32 positions are made so that a shift through any desired number of positions corresponding to at least a complete revolution of the drums 20 and 21 can be obtained. Each time a shift is made to any of the heads 385 (L₁), 391 (L₂), 393 (L₃), 395 (L₄), 397 (L₅) or 387 (L₆), the factor of 32 positions is substracted from the counter circuit associated with the head 387 (L₆) so that these factors do not erroneously affect the proper alignment of the slave card and the recorded information. Moreover, provision is made so that there will always be a sufficient count in this counter circuit to allow these factors to be subtracted without the possibility of overshooting the data past the slave card.

The flip-flops 502, 504, 506, 508 and 510 and the flip-flops 602, 604, 606 and 608 are connected as a binary counter. A count is set up in these flip-flops corresponding to the number of positions between the slave card and the recorded information. This count is established by the clock pulses from the flip-flop 440 (C) of Figure 1, these clock pulses being fed into the binary counter during the interval in which the flip-flop 706 (M) is in its "true" state, as described above. It will be remembered that the flip-flop 706 (M) is triggered to its "true" state when the indication (N) at the start position of the slave card reaches the read head 382. The flip-flop 706 is returned to its "false" state when the indication (D) at the start position of the data on the magnetic drum reaches the read head 398 (D_R).

During the shifting operation, the shifts initiated by the flip-flops 502, 504, 506, 508 and 510 are carried out before those initiated by the flip-flops 602, 604, 606 and 608 and in sequence, starting with the smallest shift. Each time a shift is made by one of the flip-flops 502, 504, 506, 508 and 510, a count of 32 positions is subtracted from the count set up in the flip-flops 602, 604, 606 and 608 to take care of the added factor of 32 positions, as mentioned previously. As also pointed out, provisions must be made so that there will always be a sufficient count in the flip-flops 602, 604, 606 and 608 to take care of such subtractions so as to avoid overshifting. This provision is achieved by adding a selected count to the binary counter, in a manner to be described, whenever its count is reduced below a certain selected value. The added count is selected to correspond to one full revolution of the drums 20 and 21 (268 positions). The added count causes the recorded data to be shifted an additional complete revolution. By inserting the additional shift of a complete revolution of the drums 20 and 21, overshifting during the operation of aligning the information on the magnetic drum 21 with the slave card on the drum 20 is prevented.

The automatic lining up of the recorded data with the slave card may be achieved in the manner to be described. As soon as the last bit of information from the master card is recorded in the signal channel 377 on the magnetic drum 21, the counter 448 (Figure 11) produces a pulse, as previously pointed out. This pulse (X) is impressed on the left input terminal of the flip-flop 702 (S) in Figure 14 to trigger that flip-flop to its "true" state so as to condition the system for the shifting process. This condition may be illustrated by the following logical equation:

$$s = X \tag{1}$$

where $s =$ the introduction of a triggering signal to the left input terminal of the flip-flop 702; and $X =$ a signal from the counter 448.

This places a relatively high voltage on the left output terminal of the flip-flop 702 (S) and conditions the "and" network 704 for translation. It should be appreciated that the output from the counter 448 may be synchronized with the clock signals from the channel 378 before being introduced to the left input terminal of the flip-flop 702.

Now, when the slave card first passes the heads 380 and 381 (Figure 10), it does not produce any control effect on the system because the "and" networks 436 and 426 of Figure 11 are conditioned for translation only for the master card, as previously described. The slave card continues its travel on the drum 20 until it reaches the read head 382 and the magnetic pulse at the first position of the lower row of this card causes the head 382 to produce a positive pulse. This pulse (N) is amplified by the amplifier 431 (Figure 14) and is passed through the "and" network 704 to the left input terminal of the flip-flop 706 (M). The "and" network 704 is conditioned to pass this pulse because the flip-flop 702 (S) is now in its "true" state, and because the flip-flop 450 (L) is in its "false" state. The pulse (N) triggers the flip-flop 706 (M) to its "true" state and initiates a count from the start position of the slave card back to the start position of the recorded data to determine the angular displacement between the two. This may be expressed by the following logical equation:

$$m = NS\bar{L} \tag{2}$$

where $m =$ the introduction of a triggering signal to the left input terminal of the flip-flop 706;

$N =$ a signal from the amplifier 431 to indicate the start position of the slave card 13;

$S =$ a relatively high voltage from the left output terminal of the flip-flop 702; and $\bar{L} =$ a relatively high voltage from the right output terminal of the flip-flop 450.

The count continues until the pulse recorded in the buffer channel 376 of the magnetic drum 21 to indicate the start position of the recorded data in the signal channel 377 reaches the read head 398. The resulting electrical pulse (D) from the read head 398 is amplified by the amplifier 708 (Figure 14) and is introduced on the right input terminal of the flip-flop 706 (M) to return that flip-flop to its "false" state and terminate the count. This may be represented as follows:

$$\bar{m} = D \tag{3}$$

where $\bar{m} =$ the introduction of a triggering signal to the right input terminal of the flip-flop 706; and $D =$ a signal from the amplifier 708 to indicate the start position of the information on the magnetic drum 21.

In a manner to be described, a count is initiated when the flip-flop 706 (M) is triggered to its "true" state and terminated when this flip-flop is triggered to its "false" state. This count is indicative of the number of positions from the start position of the slave card on the drum 20 to the start position of the information recorded on the magnetic drum 21. This count is utilized in a manner to be described subsequently to shift the information on the magnetic drum until it is aligned with the slave card.

The pulse (D) from the amplifier 708 (Figure 14) indicating the start position of the data recorded on the magnetic drum also triggers the flip-flop 712 (B) to its "true" state. This conditions the "and" network 714 to pass the clock pulses (C) to the counter 716. The counter 716 produces an output pulse (D₁) after a count corresponding to the positions occupied by the data recorded on the magnetic drum, that is, at the last position of this data. This output pulse from the counter returns the flip-flop 712 (B) to its "false" state and terminates the application of the clock pulses to the counter. The flip-flop 712 (B), therefore, is triggered to its "true" state for the duration of the reading of the recorded data by the read head 399 ($L_R$) (Figure 10).

At the start of the operation, the binary counter formed by the flip-flops 502, 504, 506, 508, 510 and 602, 604, 606 and 608 is established at zero, and the flip-flop 450 (L) is triggered to its "false" state. As previously noted, as soon as the recording from the master card is completed, the flip-flop 702 (S) (Figure 14) is triggered to its "true" state. Then when the slave card reaches the head 382, the pulse (M) from that head is amplified by the amplifier 431 and triggers the flip-flop 706 (M) to its "true" state to initiate the count. At the same time, this pulse from the amplifier 431 passes through the "and" network 518 (Figure 12), this "and" network being conditioned for translation because the flip-flop 450 (L) is in its "false" state. The cathode follower 520 ($N\bar{L}S$), therefore, produces a pulse at the start position of the card in accordance with the following logical equation:

$$cf_{520} = N\bar{L}S \qquad (4)$$

where $cf_{520}$ = the introduction of a triggering signal to the cathode follower 520; and
the other terms have previously been defined.

The pulse from the cathode follower 520 ($N\bar{L}S$) is introduced on the right input terminal of the flip-flop 502 ($A_1$) (Figure 12), on the right input terminal of the flip-flop 504 ($A_2$), on the left input terminal of the flip-flop 506 ($A_3$), on the left input terminal of the flip-flop 508 ($A_4$), on the right input terminal of the flip-flop 510 ($A_5$), on the right input terminal of the flip-flop 602 ($A_6$) (Figure 13), on the right input terminal of the flip-flop 604 ($A_7$), on the right input terminal of the flip-flop 606 ($A_8$), and on the left input terminal of the flip-flop 608 ($A_9$). Therefore, when the slave card first reaches the read head 382 ($N_R$), the binary counter is set to an initial count of 268. This corresponds to the number of positions around the periphery of the drum.

The initial setting of the binary counter may be expressed logically as follows:

$$\bar{a}_1 = N\bar{L}S \qquad (5)$$

where $\bar{a}_1$ = the introduction of a triggering signal to the right input terminal of the flip-flop 502;

$$\bar{a}_2 = N\bar{L}S \qquad (6)$$

where $\bar{a}_2$ = the introduction of a triggering signal to the right input terminal of the flip-flop 504;

$$a_3 = N\bar{L}S \qquad (7)$$

where $a_3$ = the introduction of a triggering signal to the left input terminal of the flip-flop 506;

$$a_4 = N\bar{L}S \qquad (8)$$

where $a_4$ = the introduction of a triggering signal to the left input terminal of the flip-flop 508;

$$\bar{a}_5 = N\bar{L}S \qquad (9)$$

where $\bar{a}_5$ = the introduction of a triggering signal to the right input terminal of the flip-flop 510;

$$\bar{a}_6 = N\bar{L}S \qquad (10)$$

where $\bar{a}_6$ = the introduction of a triggering signal to the right input terminal of the flip-flop 602;

$$\bar{a}_7 = N\bar{L}S \qquad (11)$$

where $\bar{a}_7$ = the introduction of a triggering signal to the right input terminal of the flip-flop 604;

$$\bar{a}_8 = N\bar{L}S \qquad (12)$$

where $\bar{a}_8$ = the introduction of a triggering signal to the right input terminal of the flip-flop 606;

$$a_9 = N\bar{L}S \qquad (13)$$

where $a_9$ = the introduction of a triggering signal to the left input terminal of the flip-flop 608.

The flip-flops 502, 504, 506, 508, 510, 602, 604, 606 and 608 are initially set to a count of 268 since each of the flip-flops represents a binary digit of increasing significance. Each flip-flop indicates a binary value of "1" for the digit in its true state and indicates a binary value of "0" for the digit in its false state. The flip-flop 502 indicates the digit of least significance and the flip-flop 504 indicates the binary digit of second least significance. Similarly, the flip-flop 608 indicates the digit of greatest significance. The flip-flops 502, 504, 506, 508, 510, 602, 604, 606 and 608 indicate a value of "268" in accordance with the logic expressed in Equations 5 to 13, inclusive, by the following digital representation:

$$(0)(2^0) + 0(2^1) + (1)(2^2) + (1)(2^3) + (0)(2^4)$$
$$+ (0)(2^5) + (0)(2^6) + (0)(2^7) + (1)(2^8) = 268$$

The initial count of the binary counter may be considered a full count in the particular embodiment of the invention referred to previously since it represents a full revolution of the magnetic drum 21. For convenience in shifting the magnetic information, the binary counter is set initially in this manner to the full count. The count is now made by subtracting down from this full count until it is terminated when the recorded information reaches the head 398 ($D_R$). This initial setting of the binary counter to the full count may be represented as follows:

| (Flip-flops) | 608($A_9$) | 606($A_8$) | 604($A_7$) | 602($A_6$) | 510($A_5$) | 508($A_4$) | 506($A_3$) | 504($A_2$) | 502($A_1$) |
|---|---|---|---|---|---|---|---|---|---|
| (Corresponding shift positions) | 256 | 128 | 64 | 32 | 16 | 8 | 4 | 2 | 1 |
| Zero shift | 0 | 0 | 0 | 0 | 0 | 0 | 0 | 0 | 0 |
| Full Count (268 Position Shift) | 1 | 0 | 0 | 0 | 0 | 1 | 1 | 0 | 0 |

The "and" network 512 (Figure 12) is also conditioned for translation when the flip-flop 706 (M) is triggered to its true state. This causes the clock pulses to be passed by the "and" network 512 to the cathode follower 514 ($M\bar{L}C$). The signals are passed to the cathode follower 514 in accordance with the logical equation:

$$cf_{514} = M\bar{L}C \qquad (13a)$$

where $cf_{514}$ = the introduction of a triggering signal to the cathode follower 514;

C = the clock signals in the channel 378; and
the other terms have previously been been defined.

The output pulses from the cathode follower 514 are impressed on the binary counter formed by the flip-flops 502, 504, 506, 508, 510, 602, 604, 606 and 608. The cathode follower 514 feeds the clock pulses (C) to the counter so long as the flip-flop 706 (M) is in its "true" state.

Now that the full count has been established, the clock pulses from the cathode follower 514 (M$\bar{L}$C) are impressed on the left and right input terminals of the flip-flops 502, 504, 506, 508, 510, 602, 604, 606 and 608. These flip-flops react in known binary manner, so that each clock pulse triggers the flip-flop 502 ($A_1$) from one state to another; the flip-flop 504 ($A_2$) is triggered only when the flip-flop 502 is triggered from a "false" to a "true" state; the flip-flop 506 ($A_5$) is triggered only when the flip-flop 504 is triggered from a "false" to a "true" state, and so on. This actuation of the flip-flops in the binary counter may be expressed by the following logical equations:

| | | |
|---|---|---|
| $a_1 = \bar{A}_1 M \bar{L} C$ | Flip-flop | (14) |
| $\bar{a}_1 = A_1 M \bar{L} C$ | 502 | (15) |
| $a_2 = \bar{A}_1 \bar{A}_2 M \bar{L} C$ | Flip-flop | (16) |
| $\bar{a}_2 = \bar{A}_1 A_2 M \bar{L} C$ | 504 | (17) |
| $a_3 = \bar{A}_1 \bar{A}_2 \bar{A}_3 M \bar{L} C$ | Flip-flop | (18) |
| $\bar{a}_3 = \bar{A}_1 \bar{A}_2 A_3 M \bar{L} C$ | 506 | (19) |
| $a_4 = \bar{A}_1 \bar{A}_2 \bar{A}_3 \bar{A}_4 M \bar{L} C$ | Flip-flop | (20) |
| $\bar{a}_4 = \bar{A}_1 \bar{A}_2 \bar{A}_3 A_4 M \bar{L} C$ | 508 | (21) |
| $a_5 = \bar{A}_1 \bar{A}_2 \bar{A}_3 \bar{A}_4 \bar{A}_5 M \bar{L} C$ | Flip-flop | (22) |
| $\bar{a}_5 = \bar{A}_1 \bar{A}_2 \bar{A}_3 \bar{A}_4 A_5 M \bar{L} C$ | 510 | (23) |
| $a_6 = \bar{A}_6 \bar{G}_1 M \bar{L} C$ | Flip-flop | (24) |
| $\bar{a}_6 = A_6 \bar{G}_1 M \bar{L} C$ | 602 | (25) |
| $a_7 = \bar{A}_6 \bar{A}_7 \bar{G}_1 M \bar{L} C$ | Flip-flop | (26) |
| $\bar{a}_7 = \bar{A}_6 A_7 \bar{G}_1 M \bar{L} C$ | 604 | (27) |
| $a_8 = \bar{A}_6 \bar{A}_7 \bar{A}_8 \bar{G}_1 M \bar{L} C$ | Flip-flop | (28) |
| $\bar{a}_8 = \bar{A}_6 \bar{A}_7 A_8 \bar{G}_1 M \bar{L} C$ | 606 | (29) |
| $a_9 = \bar{A}_6 \bar{A}_7 \bar{A}_8 \bar{A}_9 \bar{G}_1 M \bar{L} C$ | Flip-flop | (30) |
| $\bar{a}_9 = \bar{A}_6 \bar{A}_7 \bar{A}_8 A_9 \bar{G}_1 M \bar{L} C$ | 608 | (31) |

In Equations 24 to 31, inclusive, $\bar{G}_1 = \bar{A}_1 \bar{A}_2 \bar{A}_3 \bar{A}_4 \bar{A}_5$.

It is evident, therefore, that the binary counter is actuated so that the count actually proceeds down from the initially set 268 position shift, as such actuation of the flip-flop 502 ($A_1$) by the clock pulses subtracts one position from the initial count. Now, when the indication in the channel 376 (Figure 10) reaches the head 398, the flip-flop 706 (M) is triggered to its "false" condition to indicate the start of the recorded information in the channel 377. This prevents the "and" network 512 from passing the clock signals to the cathode follower 514, and the actuation of the binary counter formed by the flip-flops 502, 504, 506, 508, 510, 602, 604, 606 and 608 is terminated. The count now established in the binary counter represents the number of positions that the recorded information must be shifted around the magnetic drum 21 against the direction of rotation of the drums 20 and 21 before it will be lined up with the slave card on the drum 20.

Unless it so happened that the slave card were exactly lined up with the recorded data in the first instance, at least one of the flip-flops 502, 504, 507, 508, 510, and 602, 604, 606 and 608 will be in a "true" state representing a count on the binary counter and indicating that shifts of the recorded information must be made. Whenever any of these flip-flops is in its "true" state, the cathode follower 556 ($G_1$) (Figure 12) or the cathode follower 660 ($G_2$) (Figure 13), or both, produces a relatively high voltage at its output terminal. This can be expressed by the following logical equation:

$$g_1 = A_1 + A_2 + A_3 + A_4 + A_5 \quad (32)$$

where $g_1$ = the introduction of a signal to the cathode follower 556.

$$g_2 = A_6 + A_7 + A_8 + A_9 \quad (33)$$

where $g_2$ = the introduction of a signal to the cathode follower 660.

When a relatively high voltage appears at the output terminal of the cathode follower 556 ($G_1$) or of cathode follower 660 ($G_2$), the "and" network 718 of Figure 14 is conditioned for translation. Therefore, the pulse (D) from the head 398 ($D_R$), which is amplified in the amplifier 708 and which indicates the start of the recorded data, triggers the flip-flop 450 (L) to its "true" state so that the shifting may begin. This may be expressed by the following logical equation:

$$l = (G_1 + G_2)D \quad (34)$$

where $l$ = the introduction of a triggering signal to the left input terminal of the flip-flop 450; and the other terms have been defined.

The flip-flop 450 (L) is now in a state to direct the information from the read heads 398 ($L_R$) and 399 ($D_R$) (Figure 10) to selected ones of the shifting write heads 385 ($L_1$), 387 ($L_6$), 391 ($L_2$), 393 ($L_3$), 395 ($L_4$) and 397 ($L_5$) in the signal channel 377 of the magnetic drum and to the associated write heads in the buffer channel 376, namely, to the heads 386 ($D_1$), 388 ($D_6$), 390 ($D_2$), 393 ($D_3$), 394 ($D_4$) and 396 ($D_5$).

Sometimes the count of the binary counter formed by the flip-flops 502, 504, 506, 508, 510, 512, 602, 604, 606 and 608 down from the original 268 shifting positions may progress to a relatively low value. This low value may be less than 32 positions on the drum. Since each shift involves at least 32 positions as will be described in detail subsequently, there is a danger of overshifting. To obviate this danger, a full revolution count of 268 positions is automatically added to the counter whenever the count drops below a selected value. This causes the recorded data to be circulated an additional complete revolution around the magnetic drum before it is fed to the slave card and does not otherwise affect the number of shifts necessary to bring the data into line with the card. The remaining count at which this compensation is made may be arbitrarily chosen as 160. That is, should the count in the binary counter be reduced from the initial setting of 268 to 160 during the count-down operation represented logically by Equations 14 to 31, inclusive, the flip-flops of the counter are triggered into a pattern representing an addition of "268." The flip-flops are triggered when they have a pattern similar to that indicated below:

| Flip-flop | 608 $A_9$ | 606 $A_8$ | 604 $A_7$ | 602 $A_6$ | 510 $A_5$ | 508 $A_4$ | 506 $A_3$ | 504 $A_2$ | 502 $A_1$ |
|---|---|---|---|---|---|---|---|---|---|
| Shift positions | 256 0 | 128 1 | 64 0 | 32 1 | 16 0 | 8 0 | 4 0 | 2 0 | 1 0 |

This state of the counter conditions the "and" network 650 (Figure 13) for translation and the "and" network 650 in turn conditions the "and" network 654 for translation. This permits the next clock pulse from the flip-flop 440 to trigger the flip-flop 652 ($G_3$) to its "true" state to produce a relatively high voltage on its left output terminal and a relatively low voltage on its right output terminal. When the flip-flop 652 ($G_3$) is in its "true" state, the "and" network 532 (Figure 12) is no longer in a condition to translate the next clock pulse to the left input terminal of the flip-flop 506 ($A_3$). Therefore, the flip-flop 506 is not triggered to its "true" state as it otherwise would be. Also, the "and" network 548 is not in a condition for translation when the flip-flop 652 ($G_3$) is in its "true" condition, so that the next clock pulse does not trigger the flip-flop 510 ($A_5$) to its "true" state, and this flip-flop remains in its "false" state. The "and" network 622 (Figure 13) is also no longer conditioned for translation and the next clock pulse does not trigger the flip-flop 602 ($A_6$) to its "false" state as it otherwise would, and the flip-flop 602 remains in its "true" state. Finally, the "and" network 644 is conditioned for translation when the flip-flop 652 is in its "true" state, and the next clock pulse passes through that "and" network and triggers the flip-flop 608 ($A_9$) to its "true" state, although this flip-flop would not otherwise be triggered under normal operation of the binary counter.

The control of the various flip-flops in the binary counter described in the preceding paragraph can be expressed in the following manner:

$$a_3 = \bar{A}_1 \bar{A}_2 \bar{A}_3 \bar{G}_3 M \bar{L} C \quad (35)$$

$$a_5 = \bar{A}_1 \bar{A}_2 \bar{A}_3 \bar{A}_4 \bar{A}_5 \bar{G}_3 M \bar{L} C \quad (36)$$

$$\bar{a}_6 = \bar{G}_1 \bar{G}_3 A_6 M \bar{L} C \quad (37)$$

$$a^9 = G_3 M \bar{L} C \quad (38)$$

Therefore, when the count in the binary counter is reduced to 160, it produces a count of 268+159 instead of a count of 159. That is, it adds a count corresponding to one complete revolution of the drum 21. This can be shown as follows:

flops 502, 504, 506, 508, 510, 602, 604, 606 and 608 to indicate that the information on the magnetic drum 21 must be shifted 219 positions. This count is indicated on the binary counter in the following manner:

| (Flip-flops) | 608($A_9$) | 606($A_8$) | 604($A_7$) | 602($A_6$) | 510($A_5$) | 508($A_4$) | 506($A_3$) | 504($A_2$) | 502($A_1$) |
|---|---|---|---|---|---|---|---|---|---|
| Positions Shifted | 256 0 | 128 1 | 64 1 | 32 0 | 16 1 | 8 1 | 4 0 | 2 1 | 1 1 |

When the data recorded on the magnetic drum 21 first reaches the heads 398 ($D_R$) and 399 ($L_R$) (Figure 10), it is read and (in a manner to be described in detail) is first impressed on the heads 385 and 386, a circuit being prepared to these heads by the flip-flop 502 ($A_1$) in its "true" state. Therefore, the magnetic data is shifted by 32+1 positions and a new pulse is recorded in the buffer channel 376 to indicate the start position of this shifted data. At the same time, the flip-flop 502 ($A_1$) is triggered to its "false" state.

This data shifted by the head 399 ($L_R$) travels around the drum to the read heads 398 and 399. These read heads feed this shifted data to the heads 390 ($D_2$) and 391 ($L_2$) over a circuit prepared by the flip-flop 504 ($A_2$) in the "true" state of the flip-flop. Therefore, the recorded data is again shifted and this time by 32+2 positions. Because the flip-flop 506 ($A_3$) is in its "false" state, no circuit is prepared to the shifting heads 392 ($D_3$) and 393 ($L_3$). However, when the data recorded by the shifting heads 390 ($D_2$) and 391 ($L_2$) reaches the read heads 398 ($D_R$) and 399 ($L_R$), it is fed to the shifting heads 394 ($D_4$) and 395 ($L_4$) over a circuit prepared by the flip-flop 508 ($A_4$) in its "true" state. Therefore, the data is again shifted and this time by 32+8 positions. The data as recorded by the shifting heads 394 ($D_4$) and 395 ($L_4$) travels to the read heads 398 ($D_R$) and 399

| (Flip-flop) | 608($A_9$) | 606($A_8$) | 604($A_7$) | 602($A_6$) | 510($A_5$) | 508($A_4$) | 506($A_3$) | 504($A_2$) | 502($A_1$) |
|---|---|---|---|---|---|---|---|---|---|
| Positions Shifted | 256 | 128 | 64 | 32 | 16 | 8 | 4 | 2 | 1 |
| (160) | 0 | 1 | 0 | 1 | 0 | 0 | 0 | 0 | 0 |
| (159 and 268) | 1 | 1 | 0 | 1 | 0 | 1 | 0 | 1 | 1 |

From the above discussion, it may be seen that a count of "268" is automatically added each time that the count proceeds down to "159." Such an addition is obtained only when a determination is being made as to the separation between the beginning of the information on the drum 21 and the beginning of the slave card on the drum 20. Such an addition of "268" corresponds to a full revolution of the drum. The addition is made to prevent overshifting of the information on the magnetic drum 21 past the beginning of the slave card on the drum 20. It will be seen that such an addition of "268" may not be necessary in all cases where a count-down of "160" is reached since overshifting may not occur even when "268" is not added. For this reason, logic can be included to limit the situations for adding "268" only to the instances in which such addition is absolutely necessary.

The clock pulse translated by the "and" network 644 (Figure 13) is used to return the flip-flop 652 ($G_3$) to its "false" state so that normal operation of the binary counter will be resumed. The count then proceeds downwardly from a value of 268+159 until the start of the recorded data occurs. Each position until the start of the recorded data causes the count to be reduced by one integer as described in detail previously.

Assume now for purposes of explanation that a count has been established in the binary counter of the flip- ($L_R$) and is again rerecorded, this time by the shifting heads 396 ($D_5$) and 397 ($L_5$) over a circuit prepared to these heads by the flip-flop 510 ($A_5$) in the "true" state of the flip-flop. This causes the information to be again shifted and this time by 32+16 positions.

Therefore, up to this point, the information has been shifted by $(4 \times 32) + 1 + 2 + 8 + 16$ positions.

The factor of $4 \times 32$ positions is subtracted from the count in the portion of the binary counter including the flip-flops 602, 604, 606 and 608. There remains now the necessity for shifting the data only by a multiple of 32 positions, since it has now been shifted so that its displacement from the slave card is, in fact, an integral multiple of 32 positions. This remaining displacement actually is 128+64 positions less the factor of $4 \times 32$ positions. That is, the remaining displacement is 64 positions, and this is represented by the flip-flop 604 ($A_7$) in its "true" state.

The next time that the shifted recorded data reaches the read heads 398 ($D_R$) and 399 ($L_R$), it is shifted back to the shifting heads 387 ($L_6$) and 388 ($D_6$) through a circuit prepared by the flip-flop 604 ($A_7$) in its "true" state. The data, therefore, is re-recorded by the heads 387 ($L_6$) and 388 ($D_6$) at a new position shifted from the last position by 32 positions. The flip-flop 604 ($A_7$) is now triggered to its "false" state and the flip-flop 602 ($A_6$) is triggered to its "true" state since this represents a count-down in the flip-flops 602, 604, 606 and 608 from a value of "2" to a value of "1." This shifting is repeated a second time between the heads 398, 399 and the heads 387 and 388 by a circuit prepared by the flip-flop 602 ($A_6$) in its "true" state to make up the remaining 32 positions. The recorded data in the signal channel 377 is now aligned with the above card. At the same time that the last shift in the 32 positions is made, the flip-flop 602 ($A_6$) is triggered false. This causes all of the flip-flops 602 ($A_6$), 604 ($A_7$), 606 ($A_8$) and 608 ($A_9$) to be in their false states of operation to represent a value of "0." Such a value indicates alignment between the information stored in the magnetic drum 21 and the slave card on the drum 20. When alignment between the buffer channel on the magnetic drum 21 and the slave card on the drum 20 is obtained, the recorded data in the buffer channel becomes transferred to the slave card the next time that the buffer channel reaches the read heads 398 and 399.

Alignment between the buffer channel on the magnetic drum 21 and the slave card on the drum 20 is obtained to an accuracy within $\frac{3}{32}$ inch since this is the width of one pulse position. In many instances, this accuracy should be sufficient. If an increased accuracy in the shift should be desired, other stages can be used. For example, timing pulses can be produced at a frequency higher than the presentation of successive positions in the buffer channel on the magnetic drum. The timing pulses may have a frequency approximately 10 times as great as the rate at which the information in the buffer channel is provided.

By using a flip-flop register to count the number of cycles between the beginning of each pulse position in the buffer channel and the beginning of each pulse position on the slave card, a shift corresponding to the count of timing signals can be produced. In this way, the accuracies in the relative positioning of the buffer channel and the slave card can be increased by a factor of 10. It is believed that a person skilled in the art would be able to build a suitable register such as a flip-flop register and would be further able to incorporate this register into the system for proper operation and control.

The sequence of operations described in the preceding paragraphs is carried out in the following manner with particular reference to Figure 14. Since the flip-flops 502 ($A_1$), 450 (L) and 712 (B) are "true," and also since there is a relatively high output voltage from the cathode follower 660 ($G_2$) representing at least one "true" flip-flop in the bank 602, 604, 606 and 608, the "and" network 756 is conditioned for translation. This causes a relatively high output voltage to appear at the output terminal of the "and" network 756 so as to condition the "and" networks 768 and 782 for translation. Therefore, because the "and" network 780 is also conditioned for translation by the output from the cathode follower 660 ($G_2$), the pulse (D) in the buffer channel 376 as read by the read head 398 ($D_R$) is introduced to the write head 386 ($D_1$) to be recorded in the buffer channel at a new location so as to indicate the start position of the re-recorded data on the drum 21. This data is re-recorded at the same time in the signal channel 377 through a circuit from the read head 399 ($L_R$) through the "or" network 438 to the write head 385 ($L_1$) to be inscribed on the magnetic drum. This may be expressed by the following equations:

$$d_1 = A_1 G_2 L B D_R \quad (39)$$

$$l_1 = A_1 G_2 L B L_R \quad (40)$$

In Equations 39 and 40,

L = a relatively high voltage on the left output terminal of the flip-flop 450;
$G_2$ = a relatively high voltage from the cathode follower 660;
B = a relatively high voltage on the left output terminal of the flip-flop 712;
$D_R$ = the signals from the read head 398;
$L_R$ = the signals from the read head 399;
$l_1$ = the introduction of signals to the write head 385; and
$d_1$ = the introduction of signals to the write head 386.

So long as the flip-flop 502 ($A_1$) is in its "true" state, none of the "and" networks 758, 760, 762, 764 or 766 is conditioned for the passage of signals. Because of this, even through the flip-flops 504 ($A_2$), 508 ($A_4$), 510 ($A_5$), 604 ($A_7$) and 606 ($A_8$) are in their "true" states in the particular example under consideration, they are ineffective until the data has been transferred from the write heads 398 ($D_R$), 399 ($L_R$) to the shifting heads 385 ($L_1$), 386 ($D_1$) and the flip-flop 502 (A) has been returned to its "false" state.

The relatively high output voltage from the "and" network 756 is introduced through the "or" network 794 to condition the "and" network 796 for translation. This permits erase signals from the source 483 to pass through the "and" network 796 and through the "or" network 485 to the erase heads 370 and 372. These heads are energized so as to delete the original data on the magnetic drum 21 after it has been read by the read heads 398 ($D_R$) and 399 ($L_R$) and transferred to the write heads 385 ($L_1$) and 386 ($D_1$).

At the termination of this first reading of the data by the read head 399 ($L_R$), the flip-flop 712 (B) (Figure 14) is triggered "false" by the output pulse ($D_1$) from the counter 716. This triggering of the flip-flop 712 can be represented by the following equation:

$$\bar{b} = D^1 \quad (41)$$

where $\bar{b}$ = the introduction of a triggering signal to the right input terminal of the flip-flop 712; and
$D^1$ = a pulse indicating the last position of the recorded data on the drum 21, as represented by an output pulse from the counter 716.

Now, because the flip-flop 502 ($A_1$) is still "true," because the cathode follower 660 ($G_2$) exhibits a relatively high voltage at its output terminal and because the flip-flop 450 (L) is "true," the "and" networks 570 and 572 (Figure 12) pass the output pulse ($D^1$) from the counter 716 to indicate the end of the recorded data. This pulse is passed to the right input terminal of the flip-flop 502 ($A_1$) so that this flip-flop is returned to its "false" state. This can be represented by the following equation:

$$\bar{a}_1 = A_1 G_2 L D^1 \quad (42)$$

At the same time, since the flip-flop 450 (L) is in its "true" state and since at least one of the cathode followers 556 ($G_1$) and 660 ($G_2$) exhibits a relatively high output voltage, the "and" network 620 (Figure 13) is conditioned for translation as is the "and" network 616. Therefore, the pulse ($D^1$) from the counter 716 is passed to the left input terminal of the flip-flop 602 ($A_6$) and triggers this flip-flop to its "true" state. The pulse ($D^1$) from the counter 716 is also passed by the "and" network 620 to the cathode follower 614 (Figure 13) to be introduced by the cathode follower on the "and" networks 630, 632, 636, 638, 642 and 648. Because of the original "false" state of the flip-flop 602 ($A_6$) and because of the operation of the flip-flop 604 ($A_7$) in the "true" state for the assumed count, the "and" network 632 passes this pulse to the right input terminal of the flip-flop 604 ($A_7$) to trigger that flip-flop to the "false" state. Because of the original "true" state of the flip-flop 604, none of the other "and" networks 636, 638, 642 or 648 is conditioned for translating. Therefore, none of the other flip-flops 606 or 608 is triggered. This subtracts a count of 32 positions from the count established in the portion of the flip-flop represented by the flip-flops 602, 604, 606 and 608, which is desired. This actuation can be expressed as follows:

$$a_6 = (G_1 + G_2)LD^1\bar{A}_6 \qquad (43)$$

$$\bar{a}_7 = (G_1 + G_2)LD^1\bar{A}_6 A_7 \qquad (44)$$

Now when the data recorded by the heads 385 (L₁) and 386 (D₁) reaches the read heads 398 (D_R) and 399 (L_R), the flip-flop 712 (B) is again triggered to its "true" state by the pulse in the buffer channel as read by the head 398. The cathode follower 660 (G₂) still exhibits a relatively high voltage at its output terminal and the flip-flop 450 (L) is still "true." Therefore, since the flip-flop 502 (A₁) is now "false" and since the flip-flop 504 (A₂) is "true" for the assumed count, the "and" network 758 is conditioned for translation. This conditions the "and" networks 770 and 784 for translation. The data read by the heads 398 (D_R) and 399 (L_R) is now transferred to the write heads 390 (D₂) and 391 (L₁) for an additional shift. The condition for this may be represented by the following equation:

$$d_2 = \bar{A}_1 A_2 G_2 LBD_R \qquad (45)$$

where $d_2$ = the introduction of signals to the write head 390.

$$l_2 = \bar{A}_1 A_2 G_2 LBL_R \qquad (46)$$

where $l_2$ = the introduction of signals to the write head 391.

The "and" network 758 also causes the "and" network 796 to pass erase signals from the source 483 to the erase heads 370 and 372 to remove the data after it is read by the heads 398 and 399. At the termination of the recording by the heads 390 (D₂), and 391 (L₂), the counter 716 (A₁) (Figure 14) again generates a pulse (D¹) which returns the flip-flop 712 (B) to its "false" state. Since the flip-flop 502 (A₁) is now "false," the "and" network 574 (Figure 12) is conditioned for translation. Also, because the previous conditions still exist, the "and" network 570 passes the pulse (D¹) from the counter 716. This pulse is then passed by the "and" network 574 (Figure 12) through the "or" network 528 to the right input terminal of the flip-flop 504 (A₂) and the flip-flop 504 (A₂) is triggered to its "false" state.

Because the flip-flop 602 (A₆) is now in its "true" state, because the cathode followers 556 (G₁) and 660 (G₂) exhibit relatively high output voltages and because the flip-flop 450 (L) is still in its "true" state, the "and" network 620 (Figure 13) passes the pulse (D¹) from the counter 716 to the "and" network 626. The "and" network 626 in turn passes this pulse to the right input terminal of the flip-flop 602 (A₆). The flip-flop 602, therefore, is returned to its "false" state. The "and" network 620 also passes the pulse (D¹) from the counter 716 to the cathode follower 614 (Figure 13) and the pulse is then introduced on the "and" networks 630, 632, 636, 638, 642 and 641. However, since the flip-flop 602 (A₆) was originally in its "true" state, none of these networks is conditioned for translation. Therefore, only the flip-flop 602 (A₆) is triggered, and another 32 positions is subtracted from the count set up in the portion of the binary counter represented by the flip-flops 602, 604, 606 and 608. This latter actuation can be represented as follows:

$$\bar{a}_6 = (G_1 + G_2)LD^1 A_6 \qquad (47)$$

The next time that the data which was now recorded by the heads 390 (D₂) and 391 (L₂), reaches the read heads 398 (D_R) and 399 (L_R), the flip-flop 712 (B) is again triggered to its "true" state and, since the flip-flops 502 (A₁) and 504 (A₂) have been returned to their "false" states, and since the flip-flop 506 (A₃) is in its "false" state for the assumed count, the "and" network 760 does not become effective. Instead, the "and" network 762 (Figure 14) is conditioned and produces a relatively high voltage at its output terminal which conditions the "and" networks 774 and 788. This causes the information to be transferred from the read heads 398 (D_R) and 399 (L_R) to the write heads 394 (D₄) and 395 (L₄). This can be expressed as follows:

$$d_4 = \bar{A}_1 \bar{A}_2 \bar{A}_3 A_4 G_2 LBD_R \qquad (48)$$

where $d_4$ = the introduction of signals to the write head 394.

$$l_4 = \bar{A}_1 \bar{A}_2 \bar{A}_3 A_4 G_2 LBL_R \qquad (49)$$

where $l_4$ = the introduction of signals to the write head 395.

The "and" network 702 also causes the "and" network 796 to pass erase signals from the source 483 to the erase heads 370 and 372 to remove the data after it has been read by the heads 398 and 399.

Now, since the flip-flop 450 (L) is still "false," since the cathode follower 660 (G₂) still produces a relatively high output voltage, and since the flip-flops 502 (A₁), 504 (A₂) and 506 (A₃) are now in their "false" state; the pulse (D¹) produced by the counter 716 at the termination of the transfer from the heads 398 and 399 to the heads 394 (D₄) and 395 (L₄) is passed through the "and" networks 570 and 578 (Figure 12) to the right input terminal of the flip-flop 508 (A₄) to return that flip-flop to its "false" state.

At the same time, this pulse (D¹) from the counter 716 is impressed through the cathode follower 614 (Figure 13) on the "and" networks 616, 630, 632, 636, 638, 642 and 648. Because the flip-flops 602 (A₆) and 604 (A₇) are now in its "false" state; the "and" network 616 passes the pulse to the left input terminal of the flip-flop 602 (A₆) to trigger that flip-flop "true"; the "and" network 630 passes the pulse to the left input terminal of the flip-flop 604 (A₇) to trigger that flip-flop "true," and (because the flip-flop 606 (A₈) is "true" for the assumed count) the "and" network 638 passes the pulse to the right input terminal of the flip-flop 606 to trigger that flip-flop "false." Thus, another 32 position count is subtracted from the portion of the counter represented by the flip-flops 602, 604, 606 and 608. This can be expressed as follows:

$$a_6 = (G_1 + G_2)LD^1\bar{A}_6 \qquad (50)$$
$$a_7 = (G_1 + G_2)LD^1\bar{A}_6 \bar{A}_7 \qquad (51)$$
$$\bar{a}_8 = (G_1 + G_2)LD^1\bar{A}_6 \bar{A}_7 A_8 \qquad (52)$$

Now, when the data recorded by the heads 394 (D₄) and 395 (L₄) reaches the read heads 398 and 399, the flip-flop 712 (B) is again triggered to its "true" state. Because the flip-flops 502, 504, 506 and 508 are now "false," because the flip-flop 712 (B) is "true," because the cathode follower 660 (G₂) still exhibits a relatively high voltage at its output terminal, because the flip-flop 450 (L) is "true," and because the flip-flop 510 (A₅) is "true" for the assumed count, the "and" network 764 (Figure 14) produces at its output terminal a relatively high voltage which conditions the "and" networks 776 and 790 for translation. This causes the data from the read heads 398, 399 to be fed to the write heads 396 (D₅) and 397 (L₅). This may be represented by the following equations:

$$d_5 = \bar{A}_1 \bar{A}_2 \bar{A}_3 \bar{A}_4 A_5 G_2 LBD_R \qquad (53)$$

where $d_5$ = the introduction of signals to the write head 396.

$$l_5 = \bar{A}_1 \bar{A}_2 \bar{A}_3 \bar{A}_4 A_5 G_2 LBL_R \qquad (54)$$

where $l_5$ = the introduction of signals to the write head 397.

The "and" network 764 also causes the "and" network 796 to pass erase signals from the source 483 to the erase heads 370, 372 to remove the data after it has been read by the heads 398 and 399.

At the termination of the recording by the write head 397 (L₅), the counter 716 (Figure 14) produces a pulse (D¹) and the flip-flop 712 (B) again goes "false." Because the flip-flops 502, 504, 506 and 508 are "false," the "and" networks 570 and 580 pass the pulse ($D^1$) to the right input terminal of the flip-flop 510 ($A_5$) and this flip-flop returns to its "false" state. Now, since all the flip-flops 502, 504, 506, 508 and 510 are "false," the voltage from the cathode follower 556 ($G_1$) drops to a relatively low value and the voltage from the cathode follower 560 ($\bar{G}_1$) rises to a relatively high value. This is evident from the following equations:

$$g_1 = A_1 + A_2 + A_3 + A_4 + A_5 \tag{55}$$

$$\bar{g}_1 = \bar{A}_1 \bar{A}_2 \bar{A}_3 \bar{A}_4 \bar{A}_5 \tag{56}$$

This last pulse ($D^1$) from the counter 716 is also introduced through the "and" network 620 and through the cathode follower 614 (Figure 13) on the "and" networks 630, 632, 636, 638, 642 and 648. Also, since the flip-flop 602 ($A_6$) is in its "true" state, this pulse is introduced through the "and" network 626 to the right input terminal of the flip-flop 602 to trigger that flip-flop "false." Because the flip-flop 602 was "true," none of the "and" networks 630, 632, 636, 638, 642 and 648 are conditioned to pass the pulse ($D^1$), and none of the other flip-flops 604, 606 or 608 are triggered. Therefore, another 32 position count is subtracted from the portion of the binary counter made up by the flip-flops 602, 604, 606 and 608, as is desired. The remaining count in the counter is now the required 64 shift positions, and this is indicated by the flip-flop 604 ($A_7$) in its "true" state, and by the flip-flops 602 ($A_6$), 606 ($A_8$) and 608 ($A_9$) in their "false" states.

When the information recorded by the heads 396 ($D_5$) and 397 ($L_5$) reaches the read heads 398 and 399, the flip-flop 712 (B) is triggered to its "true" condition. Since (because the flip-flop 604 is "true") the cathode follower 660 ($G_2$) still exhibits a relatively high voltage at its output terminal indicating a count still remaining in the portion of the counter made up by the flip-flops 602, 604, 606 and 608, since (because the flip-flops 502, 504, 506, 508 and 510 are all "false") the output from the cathode follower 560 ($\bar{G}_1$) produces a relatively high voltage, and since the flip-flop 450 (L) is still in its "true" state, the "and" network 766 (Figure 14) conditions both the "and" networks 792 and 778 for translation and information is fed from the heads 398 and 399 to the heads 387 ($L_6$) and 388 ($D_6$). This may be represented by the equations:

$$d_6 = \bar{G}_1 G_2 LBD_R \tag{57}$$

where $d_6$ = the introduction of a signal to the write head 388.

$$l_6 = \bar{G}_1 G_2 LBD_R \tag{58}$$

where $l_6$ = the introduction of a signal to the write head 387.

The "and" network 766 also causes the "and" network 796 to pass erase signals from the source 483 to the erase heads 370 and 372 to remove the data after it has been read by the heads 398 and 399.

At the termination of this last recording operation, the counter 716 again generates a pulse ($D^1$) and the flip-flop 712 (B) again goes "false." Now, since the flip-flop 602 ($A_6$) is "false," because the flip-flop 450 (L) is "true" and because the cathode follower 660 ($G_2$) still exhibits a relatively high voltage at its output terminal, the "and" network 620, the cathode follower 614 and the "and" network 616 pass the pulse ($D^1$) to the left input terminal of the flip-flop 602 ($A_6$) to trigger this flip-flop to its "true" state. Also, due to the original "false" state of the flip-flop 602 ($A_6$) and because the flip-flop 604 ($A_7$) is "true," the "and" network 632 passes the pulse ($D^1$) to the right input terminal of the flip-flop 604, and that flip-flop is returned to its "false" state. This can be represented by the following equation:

$$\bar{a}_7 = (G_1 + G_2) LD^1 \bar{A}_6 A_7 \tag{58a}$$

Therefore, the count in the binary counter is now reduced to 32 shift positions, as represented by the flip-flops 602 ($A_6$) in its "true" state and by the "false" state of all the other flip-flops making up the counter.

When the data recorded by the heads 387 ($L_6$) and 388 ($D_6$) arrives at the read heads 398 and 399, the flip-flop 712 (B) is again triggered to its "true" state, and the "and" network 766 is again conditioned for translation. In the manner described above, the data is again fed from the heads 398 ($D_R$) and 399 ($L_R$) to the heads 387 ($L_6$) and 388 ($D_6$), and the erase heads 370 and 372 are again activated. At the termination of this last recording operation, and when the pulse ($D^1$) from the counter 716 triggers the flip-flop 712 (B) to its "false" state, the flip-flop 450 is still "true" and the flip-flop 602 ($A_6$) is triggered by this pulse through the conditioned "and" networks 620 and 626 and returned to its "false" state. This is represented by the following equation:

$$\bar{a}_6 = (G_1 + G_2) LD^1 A_6 \tag{59}$$

All the flip-flops making up the binary counter are now in their "false" state, and a relatively low voltage appears at the output of the cathode follower 660 ($G_2$) as is evident from the following equation, and a relatively high voltage appears at the output of the cathode follower 656 ($\bar{G}_2$) and is also evident from the following equation:

$$g_2 = A_6 + A_7 + A_8 + A_9 \tag{60}$$

$$\bar{g}_2 = \bar{A}_6 \bar{A}_7 \bar{A}_8 \bar{A}_9 \tag{61}$$

There is now a relatively high voltage at the output of the cathode follower ($\bar{G}_1$) and at the output of the cathode follower 656 ($\bar{G}_2$). Therefore, the "and" network 720 (Figure 14) is conditioned for translation. When the data next reaches the heads 398 and 399, the pulse (D) from the head 398 causes the flip-flop 450 (L) to be triggered to its "false" state. This can be expressed as:

$$\bar{l} = \bar{G}_1 \bar{G}_2 LD \tag{62}$$

Since the output voltage from the cathode follower 660 ($G_2$) is now at a relatively low value, the "and" network 780 is no longer conditioned for translation and the pulse (D) from the read head 398 ($D_R$) is not recorded.

Since the flip-flop 450 (L) is now in its "false" state, the "and" network 754 (Figure 14) is conditioned for translation, and the information from the read head 399 is passed through that network to the write head 384 ($Q_1$) to be recorded on the slave card. This is possible because the slave card is now aligned with the data on the magnetic drum and, therefore, reaches the write head 384 ($Q_1$) at the instant the data on the magnetic drum reaches the read head 399 ($L_R$). The information is now recorded on the slave card.

As previously described, the information is transferred from the magnetic drum 21 to the slave card on a parallel basis in which the information at corresponding positions in each channel is transferred at the same time. When such a parallel transfer is used, the transfer of information to the slave card can be completed in less than one revolution of the drum after alignment between the information on the magnetic drum 21 and the slave card on the drum 20 has been provided.

It should be appreciated that the transfer can also be obtained on a serial basis. In a serial transfer, the drum 20 and the magnetic drum 21 may rotate through a plurality of revolutions after the information on the magnetic drum 21 has become aligned with the slave card on the drum 20. In each revolution of the drums 20 and 21, the information in a different channel on the magnetic drum 21 may become transferred to the corresponding channel on the slave card. The different channels may be selected on a sequential basis in the successive revolutions of the drum. The selection may be obtained by a "read" head movable to the next channel on the magnetic drum 21 upon each successive rotation of the drum. The selection may also be obtained by sequentially activating the "read" heads which are disposed in contiguous relationship to the different channels in the magnetic drum 21.

It should also be appreciated that not all of the information stored in the magnetic drum 21 need be transferred to the slave card 10. For example, only the information in a certain number of positions such as the first 20 positions in each channel may become transferred by activating the flip-flop 712 (B) for these positions. It would also be possible to transfer only the information in certain positions where the positions do not necessarily have to be consecutive. This could be accomplished by including logic for controlling the triggering of the flip-flop 712 (B) into the true and false states of operation in a particular pattern of operation.

At the termination of the recording process, the slave card is transported to the output stack in the manner described previously. The flip-flop 712 (B) is returned to its "false" state by the pulse (D¹) from the counter 716, and the flip-flop 702 (S) is returned to its "true" state by the pulse (X) from the counter 448. Also, the flip-flop 450 (L) is in its "false" state, and the flip-flops 502, 504, 506, 508, 510, 602, 604, 606 and 608 are all "false" so that the counter is at zero. The system is, therefore, set up to receive the next slave card and to make the necessary shifts and record the information on that card. This operation is repeated for one slave card after another, until the counter 480 of Figure 11 produces an output pulse to terminate the process in the described manner. This also conditions the "and" network 481 for translation so that the erase heads 370 and 372 are energized to erase any data that might remain in the channels 376 and 377 on the magnetic drum 21. A new cycle of operations may be initiated by depressing the push-button switch 404 to release another master card.

The operations described previously can be represented by the following complete logical equations:

$X$ = Pulse indicating the end of recording from the master card on the magnetic drum 21.

$N$ = Pulse indicating the start position of the slave card.

$D$ = Pulse indicating the start position of the data on the magnetic drum 21.

$D^1$ = Pulse indicating the last position of the data on the magnetic drum 21.

$g_1 = A_1 + A_2 + A_3 + A_4 + A_5$   (Cathode follower 556).
$\bar{g}_1 = \bar{A}_1 \bar{A}_2 \bar{A}_3 \bar{A}_4 \bar{A}_5$   (Cathode follower 560).
$g_2 = A_6 + A_7 + A_8 + A_9$   (Cathode follower 660).
$\bar{g}_2 = \bar{A}_6 \bar{A}_7 \bar{A}_8 \bar{A}_9$   (Cathode follower 656).
$g_3 = \bar{A}_9 \bar{A}_8 \bar{A}_7 \bar{A}_6 \bar{A}_5 \bar{A}_4 \bar{A}_3 \bar{A}_2 \bar{A}_1$   (Flip-flop 652).

$b = D$
$\bar{b} = D^1$   } Flip-flop 712.

$C$ = Clock   (Flip-flop 440).

$S = X$
$\bar{s} = ML$   } Flip-flop 702.

$m = NSL$
$\bar{m} = D$   } Flip-flop 706.

$l = (G_1 + G_2)D$
$\bar{l} = \bar{G}_1 \bar{G}_2 LD$   } Flip-flop 450.

$a_1 = \bar{A}_1 M \bar{L} C$
$\bar{a}_1 = A_1 M \bar{L} C + A_1 G_2 LD^1 + N \bar{L} S$   } Flip-flop 502.

$a_2 = \bar{A}_1 \bar{A}_2 M \bar{L} C$
$\bar{a}_2 = \bar{A}_1 A_2 M \bar{L} C + \bar{A}_1 A_2 G_2 LD^1 + N \bar{L} S$   } Flip-flop 504.

$a_3 = \bar{A}_1 \bar{A}_2 \bar{A}_3 \bar{G}_3 M \bar{L} C + N \bar{L} S$
$\bar{a}_3 = \bar{A}_1 \bar{A}_2 A_3 M \bar{L} C + \bar{A}_1 \bar{A}_2 A_3 G_2 LD^1$   } Flip-flop 506.

$a_4 = \bar{A}_1 \bar{A}_2 \bar{A}_3 \bar{A}_4 M \bar{L} C + N \bar{L} S$
$\bar{a}_4 = \bar{A}_1 \bar{A}_2 \bar{A}_3 A_4 M \bar{L} C + \bar{A}_1 \bar{A}_2 \bar{A}_3 A_4 G_2 LD^1$   } Flip-flop 508.

$a_5 = \bar{A}_1 \bar{A}_2 \bar{A}_3 \bar{A}_4 \bar{A}_5 \bar{G}_3 M \bar{L} C$
$\bar{a}_5 = \bar{A}_1 \bar{A}_2 \bar{A}_3 \bar{A}_4 A_5 M \bar{L} C + \bar{A}_1 \bar{A}_2 \bar{A}_3 \bar{A}_4 A_5 G_2 LD^1 + N \bar{L} S$   } Flip-flop 510.

$a_6 = (\bar{G}_1 M \bar{L} C + [G_1 + G_2] LD^1) \bar{A}_6$
$\bar{a}_6 = (\bar{G}_1 \bar{G}_3 M \bar{L} C + [G_1 + G_2] LD^1) A_6 + N \bar{L} S$   } Flip-flop 602.

$a_7 = (\bar{G}_1 M \bar{L} C + [G_1 + G_2] LD^1) \bar{A}_6 \bar{A}_7$
$\bar{a}_7 = (\bar{G}_1 M \bar{L} C + [G_1 + G_2] LD^1) \bar{A}_6 A_7 + N \bar{L} S$   } Flip-flop 604.

$a_8 = (\bar{G}_1 M \bar{L} C + [G_1 + G_2] LD^1) \bar{A}_6 \bar{A}_7 \bar{A}_8$
$\bar{a}_8 = (\bar{G}_1 M \bar{L} C + [G_1 + G_2] LD^1) \bar{A}_6 \bar{A}_7 A_8 + N \bar{L} S$   } Flip-flop 606.

$a_9 = (\bar{G}_1 M \bar{L} C + [G_1 + G_2] LD^1) \bar{A}_6 \bar{A}_7 \bar{A}_8 \bar{A}_9 + G_3 M \bar{L} C + N \bar{L} S$
$\bar{a}_9 = (G_1 M \bar{L} C + [G_1 + G_2] LD^1) \bar{A}_6 \bar{A}_7 \bar{A}_8 A_9$   } Flip-flop 608.

$L_R$ = Read Head 399
$D_R$ = Read Head 398

$l_1 = A_1 G_2 L B L_R$   (Shifting write head 385).
$d_1 = A_1 G_2 L B D_R$   (Shifting write head 386).
$l_2 = \bar{A}_1 A_2 G_2 L B L_R$   (Shifting write head 391).
$d_2 = \bar{A}_1 A_2 G_2 L B D_R$   (Shifting write head 390).
$l_3 = \bar{A}_1 \bar{A}_2 A_3 G_2 L B D_R$   (Shifting write head 393).
$d_3 = \bar{A}_1 \bar{A}_2 A_3 G_2 L B D_R$   (Shifting write head 392).

$$l_4 = \bar{A}_1 A_2 \bar{A}_3 A_4 G_2 LBL_R \quad \text{(Shifting write head 395).}$$
$$d_4 = \bar{1}_1 A_2 \bar{A}_3 A_4 G_2 LBD_R \quad \text{(Shifting write head 394).}$$
$$l_5 = \bar{A}_1 \bar{A}_2 \bar{A}_3 \bar{A}_4 A_5 G_2 LBL_R \quad \text{(Shifting write head 397).}$$
$$d_5 = \bar{A}_1 \bar{A}_2 \bar{A}_3 \bar{A}_4 A_5 G_2 LBD_R \quad \text{(Shifting write head 396).}$$
$$l_6 = \bar{G}_1 G_2 LBL_R \quad \text{(Shifting write head 387).}$$
$$d_6 = \bar{G}_1 G_2 LBD_R \quad \text{(Shifting write head 388).}$$

It will be seen that the system will still operate properly if a slave card should happen to overlap the recorded data in the first instance. As before the pulse (N) indicating the start position of the card will initiate the count to the data. If the overlapped data lags the card, almost a full count will remain in the counter, and the data will be shifted increment by-increment in the direction opposite to the direction of rotation around almost the entire circumference of the magnetic drum until alignment with the slave card is achieved. If on the other hand, the data leads the overlapping slave card, the count down will be excessive so that the factor ($G_3$) will be used. Then, the data will be shifted past the card and around the full circumference of the magnetic drum into final alignment.

The system and apparatus of the present invention operates in the manner described to duplicate the data on a master card onto a multiplicity of slave cards. This operation is efficiently and quickly carried out by the use of a magnetic drum that may be coaxial with the transporting drum and which is driven concurrently with the transporting drum. It is clear that the magnetic drum need not necessarily be coaxial with the transporting drum, and that any suitable information storage means or memory can be used which is driven synchronously with the transporting drum.

It should be appreciated that certain stages and operations are included only by way of illustration. For example, the number of positions between the start position on the slave card 13 and the start position on the buffer can be determined by counting up from a value of "0" rather than counting down from a value of "268." The spacing of the different heads such as the heads 385, 391 and 393 can also be varied without affecting the basic operation of the system. It should also be appreciated that certain stages such as amplifiers between the read and write heads have sometimes been omitted for purposes of simplification since it is believed that persons skilled in the art would understand that these amplifiers should be included.

Various other modifications and simplifications can be made in the apparatus constituting this invention. For example, the marker channel and the heads 386 ($D_1$), 390 ($D_2$), 392 ($D_3$), 394 ($D_4$), 396 ($D_5$) and 388 ($D_6$) can be eliminated by including the marker pulses in one of the information channels. For example, the start pulse can be included as an advance pulse in the information channel and can be read by the heads such as the head 385 ($L_1$). The start pulse can be separated by a particular number of positions from the beginning of the information in the channel read by the heads such as the head 385 ($L_1$). This particular number of positions can be counted off so that an output pulse can be produced at the end of this count to indicate the beginning of information.

As has been previously described, information is shifted by a factor of at least 32 positions corresponding to a distance of 3 inches to obtain alignment between the slave card and the information on the magnetic drum 21. For example, the head 385 ($L_1$) becomes activated to shift the information on the magnetic drum 21 by a single group of 32 positions plus an additional 1 position. By including a single group of 32 positions in each shift, assurance is provided that the information on the magnetic drum 21 can be shifted by any amount up to a complete revolution of the drum so as to obtain alignment between this information and the slave card on the drum 20.

It should be appreciated that alignment can be accomplished without shifting the information every time through a single group of 32 pulse positions. Alignment can be accomplished in this manner by including on the magnetic drum 21 a second channel in addition to the information channel 376. The information can then be transferred back and forth between the second channel and the information channel 376 until alignment between the slave card and the information in the channel 376 is obtained.

The introduction of clock signals to certain stages in the drawings have been omitted for purposes of convenience. For example, clock signals should be introduced to the stages controlling the shifting of the information on the magnetic drum 21 to obtain alignment between this information and the slave card on the drum 20. Clock signals should also be introduced to the stages controlling the transfer of information from the master card to the magnetic drum 21 and subsequently from the magnetic drum 21 to the slave card. Such clock signals should be introduced to the various stages described in this paragraph in order to obtain an optimum transfer of information. To be consistent, clock signals have not been specified in the logic setting forth on an algebraic basis the operation of these stages. It is believed that a person skilled in the art would know how to introduce clock signals to the various stages including the stages described in this paragraph so as to obtain an optimum operation of these stages. It is also believed that a person skilled in the art would be able to determine exactly which of the stages should receive the clock signals.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In apparatus for transferring data from one information storage card to another, the combination of: a first input stack for retaining cards having data stored therein in successive positions, a second input stack for retaining cards onto which data is to be transferred in successive positions, transport means for the cards, first transfer means disposed in co-operative relationship with the transport means for obtaining a transfer of a card from said first input stack to said transport means, information storage means having a plurality of positions and operative to present successive positions at the same rate as the successive positions on the cards transferred to the transport for movement, means including first transducing means for sensing the data on the first card and for introducing such data to said information storage means, second transfer means disposed in co-operative relationship with the transport means for subsequently obtaining a transfer of a card from said second input stack to said transport means, and means including second transducing means for introducing data stored in said information storage means to the second card after the transfer of the card to the transport means and in positions on the second card related to the positions of the corresponding data on the first card.

2. In apparatus for transferring data from one storage card to another, the combination of: means including a first rotatable drum for holding cards in fixed position on the drum for movement with the drum, first transfer means for obtaining a transfer of a first card having data stored thereon to said drum, a storage drum rotatable to present information in synchronism with the information on the cards carried by the first drum, means including first transducing means responsive to the data stored on the first card and coupled to the storage drum for sensing data on said first card and for introducing such data to said storage drum, second transfer means for obtaining a transfer of a second card to the first drum after the introduction of data from the first card to the storage drum, and means including second transducing means coupled to the storage drum for subsequently introducing the data in said storage drum to the second card after the transfer of the card to the rotatable drum and in synchronous relationship with the data on the first card.

3. In apparatus for transferring data from one storage card to another, the combination of: means including a rotatable transporting drum for obtaining a movement of cards with the drum, first transfer means for obtaining a transfer of a first card having data stored thereon to said drum, a rotatable magnetic storage drum mechanically coupled to said transporting drum for the presentation of data in synchronism with the presentation for data of the card on the transporting drum, means including first transducing means responsive to the signal indications on the first card and coupled to the storage drum for sensing data on the first card and for introducing such data to said storage drum, second transfer means for obtaining a transfer of a second card to the transporting drum, and means including second transducing means coupled to the storage drum for subsequently introducing data in said storage drum to the second card after the transfer of the card to the transporting drum and in particular positions on the second card relative to the positioning of such data on the first card.

4. The combination defined in claim 3 in which said magnetic storage drum is mounted in coaxial relation with said transporting drum and is affixed thereto.

5. In apparatus for transferring information from one storage card to another, the combination of: transport means movable in a closed loop and constructed to provide a movement of cards in accordance with its own movement and having a first circumferential transporting section and a second circumferential recording section, means including first transducing means associated with said first section for sensing information on a storage card transported thereby, means including second transducing means responsive to the information sensed by the first transducing means for recording signals from said first transducing means on said second section, and means responsive to the signal indications recorded in the second section for causing information from said second section to be recorded on a storage card transported by said first section in particular positioning relative to the corresponding information on the first card.

6. Card processing apparatus, including, means including a rotatable drum for transporting cards on the periphery thereof, a magnetic storage drum affixed to said transporting drum in coaxial relation therewith, card processing means coupled to the storage drum and including a first transducer for reading information on a card transported by said drum and a second transducer for writing such information in said magnetic storage drum, a control system coupled to the storage drum for synchronizing the information so written in said magnetic storage drum with the successive positions in a subsequent card transported on said transporting drum, and means controlled by said control system for reading the information in said magnetic storage drum and for writing the same on the subsequent card when synchronization has been achieved between the information in said magnetic storage drum and the successive positions in such subsequent card.

7. Card processing apparatus for recording data on cards having a plurality of positions for the storage of information, including, transport means for the cards, storage means having a plurality of positions for storing information and providing the presentation of successive positions in the storage means in synchronous relationship with the presentation of successive positions on the transported cards, means coupled to the storage means for providing for the recording of information in the storage means, control means coupled to the storage means for shifting the presentation of the information by the storage means to synchronize this presentation with the presentation of successive positions on the transported cards, and card processing means coupled to the storage means and the control means for providing for the transfer of information in the storage means to transported cards at positions on the cards corresponding to the positioning of the information in the storage means upon a particular synchronization in the presentation of the information in the storage means and in the presentation of the successive positions on the transported cards.

8. Card processing apparatus for recording data on cards having a plurality of positions for the storage of information, including, means including movable transport means for providing a movement of cards with the transport means, storage means movable with the transport means and having a plurality of positions for storing information, means including transducing means coupled to the storage means and including electrical circuitry for storing information in the storage means, means including transducing means coupled to the storage means and including electrical circuitry for shifting the information in the storage means in accordance with the presentation of the successive positions of a particular transported card, and means including transducing means coupled to the storage means and including electrical circuitry for obtaining a transfer of the signal information to the successive positions on the particular card upon a particular synchronous presentation of the storage means and the successive positions on the particular transported card.

9. In apparatus for transferring data from the data positions of a first information storage card to the data positions of a second information storage card, the combination of: transport means for the cards, means including electrical circuitry for obtaining a transfer to said transport means of the first card, means including information storage means having a plurality of positions for providing a presentation of the positions in synchronous relationship with the presentation of the positions on the transported cards, means including electrical circuitry and including transducing means coupled to the information storage means for obtaining a transfer of information on data positions of the first card to the data positions of the information storage means, means including electrical circuitry for obtaining a transfer to said transport means of the second card, means including electrical circuitry and including transducing means coupled to the information storage means for shifting the information in the storage means to synchronize this information with the presentation of the data positions on the second card, and means including electrical circuitry and including transducing means coupled to the information storage means for transferring the information in the information storage means to the data positions on the second card upon the synchronization in the presentation of the data positions on the second card and the information in the second storage means.

10. Apparatus as set forth in claim 9 in which the shifting means is connected to provide a plurality of shifts in the information in the storage means with each shift occurring over a progressive number of positions in comparison to the previous shift to obtain a synchronization in the presentation of this information with the presentation of the data positions on the second card.

11. In apparatus for transferring data from the data positions on a first storage card to the data positions on a second storage card, the combination of: means including a rotatable transport drum constructed to hold cards in fixed position on the drum during the drum rotation, means including transfer means coupled to the drum for obtaining a transfer of the first card to the drum and for subsequently obtaining a transfer of the second card to the drum, a rotatable storage drum mechanically coupled to the transport drum for rotation in synchronism with the transport drum, first transducing means disposed in coupled relationship to the cards on the transport drum for sensing data on the first card, second transducing means disposed in coupled relationship to the storage drum for recording data on the storage drum, and for reading data from the storage drum, a first control system coupled to the first and second transducing means for introducing signals from the first transducing means to the second transducing means for the recording of data on the storage drum from the first card, third transducing means coupled to the cards on the transport drum for recording information on the second card, and a second control system coupled to the third transducing means for shifting the information in the storage drum into synchronous relationship with the presentation of the data positions on the second card to the third transducing means and, upon the shifting of the information into the synchronous relationship, for introducing to said transducing means data recorded by the second transducing means to obtain the recording of data from the storage drum to the second card.

12. In apparatus for transferring data from the data positions of a first storage card to the data positions of a second storage card, the combination of: means including a rotatable transport drum constructed to hold the cards in fixed position on the drum during the drum rotation, means including transfer means coupled to the first and second cards for obtaining a transfer of the first card to the drum and subsequently obtaining a transfer of the second card to the drum, a rotatable storage drum mechanically coupled to the transport drum for rotation in synchronism with the transport drum, first transducing means coupled to the cards on the transport drum for sensing data on the first card, second transducing means coupled to the storage drum for providing a transfer of information between the storage drum and the second transducing means, a first control system electrically coupled to the first and second transducing means for introducing signals from the first transducing means to the second transducing means and for causing data corresponding to such signals to be recorded by the second transducing means on the storage drum, third transducing means coupled to the cards on the transport drum for recording information on the second card, a second control system responsive to the signal indications in the storage drum and coupled to the third transducing means for shifting the signal information on the storage drum to synchronize this information with the presentation to the third transducing means of the data positions on the second card, and a third control system coupled to the third transducing means for introducing recorded data from the storage drum to the third transducing means for recording on the second card upon the synchronization in the presentation of the data positions on the second card to the third transducing means and the presentation of the information on the storage drum to the record transducing means.

13. In apparatus for transferring information from the data positions of a first storage card to the data positions of a second storage card, the combination of: means including a rotatable transport drum constructed to hold cards in fixed position on the drum during the drum rotation, means including transfer means coupled to the first and second cards for obtaining a transfer of the first card to the transport drum and for subsequently obtaining a transfer of the second card to the drum, a rotatable magnetic storage drum coupled to the transport drum for movement with the transport drum, means including first transducing means coupled to the cards on the transport drum for sensing the data on the first card and for recording this data on the storage drum, second transducing means including a plurality of magnetic writing heads coupled to the storage drum at particular angular positions on the drum and at least one magnetic reading head coupled to the storage drum and disposed a particular angular distance from the writing heads in the plurality in the direction of rotation of the storage drum, a first control system responsive to the data on the storage drum and coupled to the second transducing means for introducing signals from the storage drum to the reading head in the second transducing means and for recurrently introducing signals from the reading head to selected ones of the writing heads in the second transducing means until data corresponding to such signals is recorded on the storage drum in a particular relationship with respect to the disposition of the data positions of the second card on the transport drum, third transducing means coupled to the cards on the transport drum for recording information on the second card, and a second control system responsive to the data on the storage drum and coupled to the third transducing means for introducing recorded data on the storage drum to the third transducing means upon the particular relationship between the occurrence of the data positions on the second card and the information recorded on the storage drum.

14. In apparatus for transferring information from the data positions of a first storage card to the data positions of a second storage card, the combination of: a rotatable drum having a first circumferential transporting section constructed to hold cards in fixed position on the section during the drum rotation and having a second circumferential magnetic recording section, means including the drum for obtaining a fixed positioning of the cards on the first section of the drum during the drum rotation, first transducing means coupled to the cards on the first section of the drum for sensing the information on the first storage card, second transducing means coupled to the second section of the drum for recording information on the second section, and for reading information from the second section, means coupled to the first and second transducing means for introducing signals from the first transducing means to the second transducing means to obtain a recording of the information from the storage card on the second section of the drum, third transducing means coupled to the cards on the first section of the drum for recording the information from the second section on the second storage card upon the transport of the second storage card by the first section of the drum, means coupled to the second section of the drum for successively reading and writing such information on said second section to change the angular position of such information on the second section for a desired angular positioning between such information and the presentation of the data positions on the second card to the third transducing means, and means coupled to the second section of the drum and to the third transducing means for introducing the recorded information on the storage section of the drum to the third transducing means upon the desired angular positioning of such information on the storage section of the drum to obtain the recording of information from the storage section of the drum to the second card.

15. In apparatus for transferring information from the data positions of a first storage card to the data positions of a second storage card, the combination of: a rotatable drum having a first circumferential transporting section constructed to hold cards in fixed position on the drum during the drum rotation and having a second circumferential magnetic recording section, means including the drum for obtaining a fixed positioning of cards on the first section of the drum during the drum rotation, first transducing means coupled to the cards on the first section of the drum for sensing the information on the first storage card during the transport of the first card by the drum, second transducing means coupled to the second section of the drum for recording information on the second section, and for reading information on the second section, means coupled to the first and second transducing means for introducing information from the first transducing means to the second transducing means to obtain a recording of information from the first storage card on the second section of the drum, means coupled to the first transducing means for producing a signal indicative of the position of the second card upon the transport of the second card by the first section, a counter coupled to the second transducing means and to the last mentioned means for determining the angular position of the information recorded on the second section relative to the data positions on the second card, means controlled by the counter for successively reading and writing the information on the second section of the drum to bring such information into alignment with the data positions of the second card, third transducing means coupled to the cards on the first section of the drum for recording the information from said second section on the second card, and means controlled by the counter and coupled to the third transducing means for introducing recorded information from the second section of the drum to the third transducing means after such alignment between the information on the storage section of the drum and the data positions of the second card to obtain a transfer of information from the storage section to the second card.

16. In apparatus for transferring information to the data positions of a storage card, the combination of: means including a rotatable drum for transporting the card on the periphery of the drum, movable storage means having a plurality of data positions for the storage of information and synchronized in movement with the movement of the drum to present successive positions in the storage means at the same rate as the successive data positions on the card on the drum, card processing means coupled to the storage means for shifting the disposition of the information in the storage means relative to the presentation of the data positions on the drum to synchronize the presentation of this information with the presentation of the successive data positions on the card, and card processing means coupled to the storage means for reading information on the storage means and for writing the information on the data positions of the card transported by the drum upon a synchronization in the presentation of the information on the storage means and of the successive data positions on the card.

17. In apparatus for transferring information from the data positions of a first storage card to the data positions of a second storage card, the combination of: means including a rotatable drum for transporting cards on the periphery of the drum, storage means having a plurality of positions and synchronized in movement with the drum to synchronously present successive positions on the storage means and successive positions on cards transported by the drum, card processing means coupled to the storage means for reading information on the successive data positions of the first card transported by the drum and for writing such information on the storage means, control means coupled to the storage means for synchronizing the information on the storage means with the data positions of the second card transported by the drum, and means coupled to the control means and to the storage means for reading the information on the storage means and for writing such information on the data positions of such second card upon a synchronization of the data positions on the second card and the information recorded in the successive positions of the storage means.

References Cited in the file of this patent

UNITED STATES PATENTS

| | | |
|---|---|---|
| 2,702,380 | Brustman | Feb. 15, 1955 |
| 2,718,356 | Burrell | Sept. 20, 1955 |
| 2,721,990 | McNaney | Oct. 25, 1955 |
| 2,783,048 | Roberts | Feb. 26, 1957 |